(12) United States Patent
Lottermoser et al.

(10) Patent No.: US 12,675,606 B2
(45) Date of Patent: Jul. 7, 2026

(54) INTEGRATION BETWEEN MESSAGING SYSTEMS AND COLLABORATIVE APPLICATIONS

(71) Applicant: Apple Inc., Cupertino, CA (US)

(72) Inventors: Stephen M. Lottermoser, San Jose, CA (US); Alejandro A. Rodriguez, Saratoga, CA (US); Alexandre S. Lacour, San Francisco, CA (US); Charles Circlaeys, San Francisco, CA (US); Craig M. Federighi, Los Altos Hills, CA (US); Delfina Jovanovska, San Francisco, CA (US); Devin O. Clary, Scotts Valley, CA (US); Elana L Stettin, San Francisco, CA (US); Elliot A. Barer, Santa Clara, CA (US); Jae Woo Chang, Cupertino, CA (US); Johannes B. Fortmann, Oakland, CA (US); Miranda J. Zhou, San Jose, CA (US); Nihar Sharma, Detroit, MI (US); Pierre J. De Filippis, Los Gatos, CA (US); Richard B. Blair, San Jose, CA (US); Ryan A. Williams, Morgan Hill, CA (US); Vasilios E. Anton, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 18/203,339

(22) Filed: May 30, 2023

(65) Prior Publication Data

US 2023/0394176 A1 Dec. 7, 2023

Related U.S. Application Data

(60) Provisional application No. 63/349,033, filed on Jun. 3, 2022.

(51) Int. Cl.
| | | |
|---|---|---|
| *G06F 21/00* | (2013.01) | |
| *G06F 21/60* | (2013.01) | |
| *G06F 21/62* | (2013.01) | |

(52) U.S. Cl.
CPC ........ *G06F 21/6254* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 8,484,292 B2 | 7/2013 | Spataro et al. | |
| 8,621,649 B1 * | 12/2013 | Van Dijk | G06F 21/60 |
| | | | 726/1 |

(Continued)

FOREIGN PATENT DOCUMENTS

| WO | WO 2016/131044 | 8/2016 |
|---|---|---|

OTHER PUBLICATIONS

Feldman et al., "SPORC: Group Collaboration using Untrusted Cloud Resources," USENIX, The Advanced Computing Systems Association, Sep. 2010, retrieved from https://www.usenix.org/legacy/event/osdi10/tech/full_papers/Feldman.pdf, 14 pages.

(Continued)

*Primary Examiner* — Maung T Lwin
(74) *Attorney, Agent, or Firm* — BAKERHOSTETLER

(57) ABSTRACT

Aspects of the subject technology provide for integration between a messaging system and a collaborative application. A messaging system may receive, via user input, an instruction to create a message thread with a plurality of user accounts. The message thread may include a document link associated with a collaborative application. The messaging system may generate, for each of the user accounts, an obfuscated identifier associated with that user account and a (Continued)

document link. The messaging system may provide the obfuscated identifiers to the collaborative application. An initial message exchanged between the plurality of user accounts with the document link in the message thread may establish, for the collaborative application, the obfuscated identifiers that will be associated with the document link.

37 Claims, 10 Drawing Sheets

(56) References Cited

U.S. PATENT DOCUMENTS

| | | | | |
|---|---|---|---|---|
| 8,887,297 | B2 * | 11/2014 | Reid | H04L 9/3247 |
| | | | | 713/180 |
| 10,019,129 | B2 * | 7/2018 | Han | G06Q 30/00 |
| 10,044,654 | B2 * | 8/2018 | Papa | H04L 51/212 |
| 10,284,558 | B2 | 5/2019 | Owen et al. | |
| 10,579,823 | B2 * | 3/2020 | Eigner | G06F 21/6254 |
| 10,623,367 | B2 | 4/2020 | Cue et al. | |
| 11,012,428 | B1 * | 5/2021 | Thirumalai | H04L 51/08 |
| 2006/0026502 | A1 | 2/2006 | Dutta | |
| 2006/0288074 | A1 * | 12/2006 | Rosenberg | H04N 21/4882 |
| | | | | 348/E7.071 |
| 2011/0225200 | A1 * | 9/2011 | Danis | G06F 16/24564 |
| | | | | 726/1 |
| 2015/0348102 | A1 * | 12/2015 | Alsina | G06Q 30/0255 |
| | | | | 705/14.53 |
| 2018/0062852 | A1 * | 3/2018 | Schmahmann | G06Q 10/101 |
| 2020/0374106 | A1 * | 11/2020 | Padmanabhan | H04L 63/105 |
| 2022/0067199 | A1 * | 3/2022 | Taber | G06F 21/6254 |
| 2023/0011779 | A1 * | 1/2023 | Delavari-Maraghi | |
| | | | | G06Q 30/0227 |

OTHER PUBLICATIONS

International Search Report and Written Opinion from PCT/US2023/024081, dated Sep. 5, 2023, 26 pages.
European Patent Application No. 23735490.7; Examination Report dated Apr. 2, 2024, 6 pages.

* cited by examiner

300

400

600

800

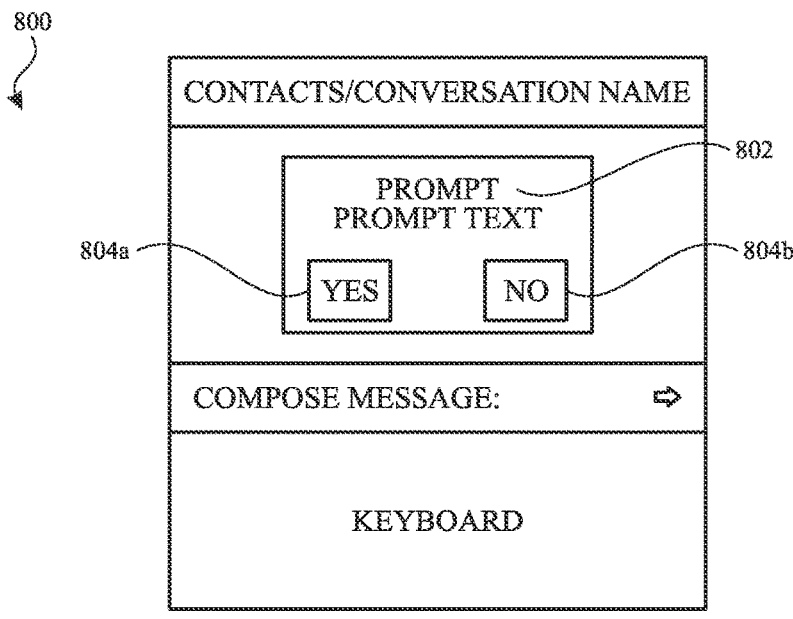

RECEIVE, VIA USER INPUT, AN INSTRUCTION TO CREATE A MESSAGE THREAD WITH A PLURALITY OF USER ACCOUNTS, THE MESSAGE THREAD INCLUDING A DOCUMENT LINK ASSOCIATED WITH A COLLABORATIVE APPLICATION ~902

GENERATE, FOR EACH OF THE USER ACCOUNTS, AN OBFUSCATED IDENTIFIER ASSOCIATED WITH THAT USER ACCOUNT AND THE DOCUMENT LINK ~904

PROVIDE THE OBFUSCATED IDENTIFIER TO THE COLLABORATIVE APPLICATION ~906

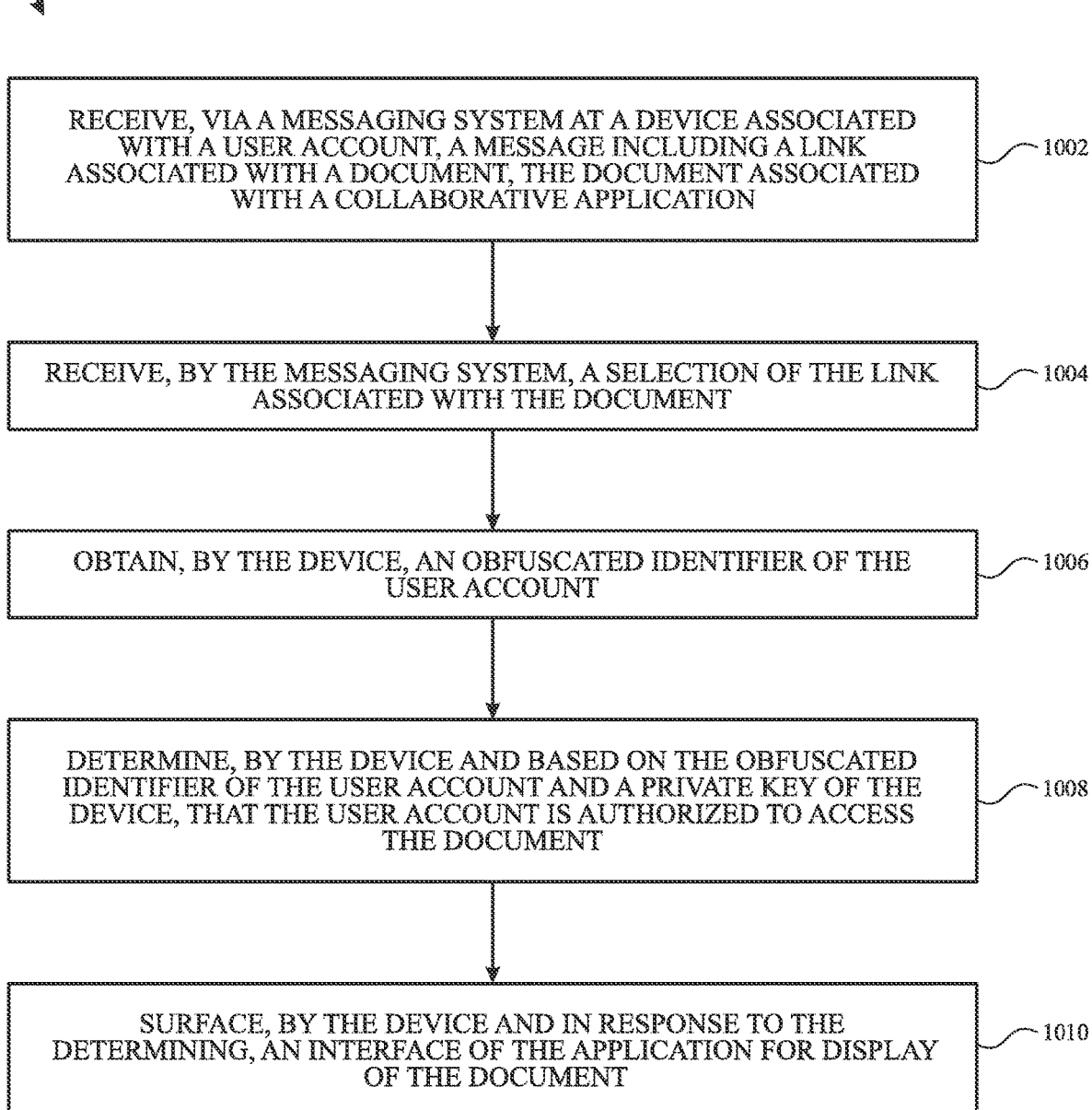

RECEIVE, VIA A MESSAGING SYSTEM AT A DEVICE ASSOCIATED WITH A USER ACCOUNT, A MESSAGE INCLUDING A LINK ASSOCIATED WITH A DOCUMENT, THE DOCUMENT ASSOCIATED WITH A COLLABORATIVE APPLICATION ~1002

RECEIVE, BY THE MESSAGING SYSTEM, A SELECTION OF THE LINK ASSOCIATED WITH THE DOCUMENT ~1004

OBTAIN, BY THE DEVICE, AN OBFUSCATED IDENTIFIER OF THE USER ACCOUNT ~1006

DETERMINE, BY THE DEVICE AND BASED ON THE OBFUSCATED IDENTIFIER OF THE USER ACCOUNT AND A PRIVATE KEY OF THE DEVICE, THAT THE USER ACCOUNT IS AUTHORIZED TO ACCESS THE DOCUMENT ~1008

SURFACE, BY THE DEVICE AND IN RESPONSE TO THE DETERMINING, AN INTERFACE OF THE APPLICATION FOR DISPLAY OF THE DOCUMENT ~1010

*FIG. 10*

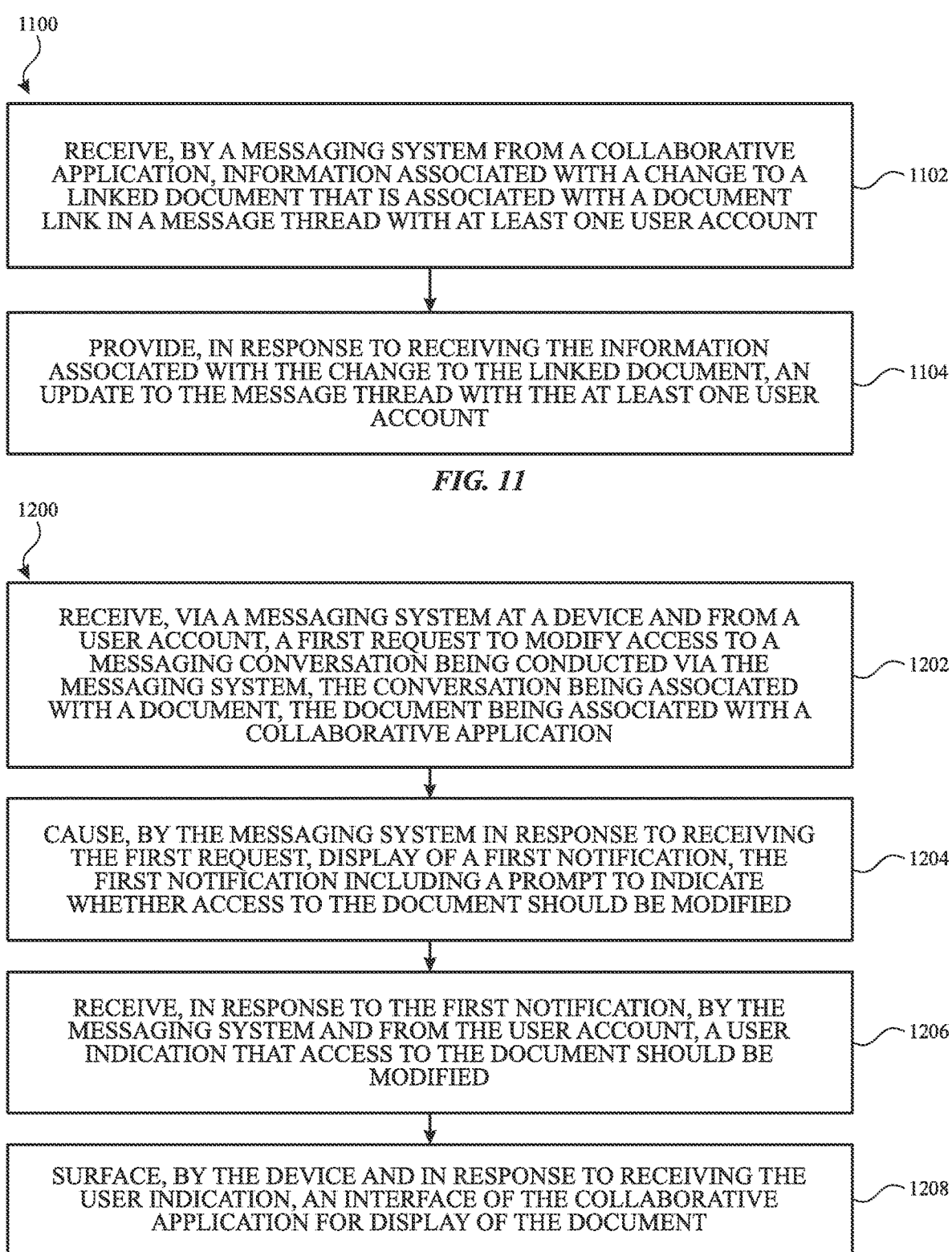

1100

RECEIVE, BY A MESSAGING SYSTEM FROM A COLLABORATIVE APPLICATION, INFORMATION ASSOCIATED WITH A CHANGE TO A LINKED DOCUMENT THAT IS ASSOCIATED WITH A DOCUMENT LINK IN A MESSAGE THREAD WITH AT LEAST ONE USER ACCOUNT          1102

PROVIDE, IN RESPONSE TO RECEIVING THE INFORMATION ASSOCIATED WITH THE CHANGE TO THE LINKED DOCUMENT, AN UPDATE TO THE MESSAGE THREAD WITH THE AT LEAST ONE USER ACCOUNT          1104

RECEIVE, VIA A MESSAGING SYSTEM AT A DEVICE AND FROM A USER ACCOUNT, A FIRST REQUEST TO MODIFY ACCESS TO A MESSAGING CONVERSATION BEING CONDUCTED VIA THE MESSAGING SYSTEM, THE CONVERSATION BEING ASSOCIATED WITH A DOCUMENT, THE DOCUMENT BEING ASSOCIATED WITH A COLLABORATIVE APPLICATION          1202

CAUSE, BY THE MESSAGING SYSTEM IN RESPONSE TO RECEIVING THE FIRST REQUEST, DISPLAY OF A FIRST NOTIFICATION, THE FIRST NOTIFICATION INCLUDING A PROMPT TO INDICATE WHETHER ACCESS TO THE DOCUMENT SHOULD BE MODIFIED          1204

RECEIVE, IN RESPONSE TO THE FIRST NOTIFICATION, BY THE MESSAGING SYSTEM AND FROM THE USER ACCOUNT, A USER INDICATION THAT ACCESS TO THE DOCUMENT SHOULD BE MODIFIED          1206

SURFACE, BY THE DEVICE AND IN RESPONSE TO RECEIVING THE USER INDICATION, AN INTERFACE OF THE COLLABORATIVE APPLICATION FOR DISPLAY OF THE DOCUMENT          1208

RECEIVE, VIA A MESSAGING APPLICATION AT A DEVICE AND
FROM A COLLABORATIVE APPLICATION, A REQUEST TO DISPLAY
A MESSAGE THREAD WITHIN AN INTERFACE OF THE
COLLABORATIVE APPLICATION ⟋1302

CAUSE DISPLAY OF THE MESSAGE THREAD WITHIN THE
INTERFACE OF THE COLLABORATIVE APPLICATION BY PROVIDING
THE MESSAGE THREAD FOR DISPLAY WITHIN A PLACEHOLDER
BLOCK PROVIDED BY THE COLLABORATIVE APPLICATION WITHIN
THE INTERFACE OF THE COLLABORATIVE APPLICATION, WITHOUT
PROVIDING THE MESSAGE THREAD TO THE COLLABORATIVE
APPLICATION. ⟋1304

*FIG. 13*

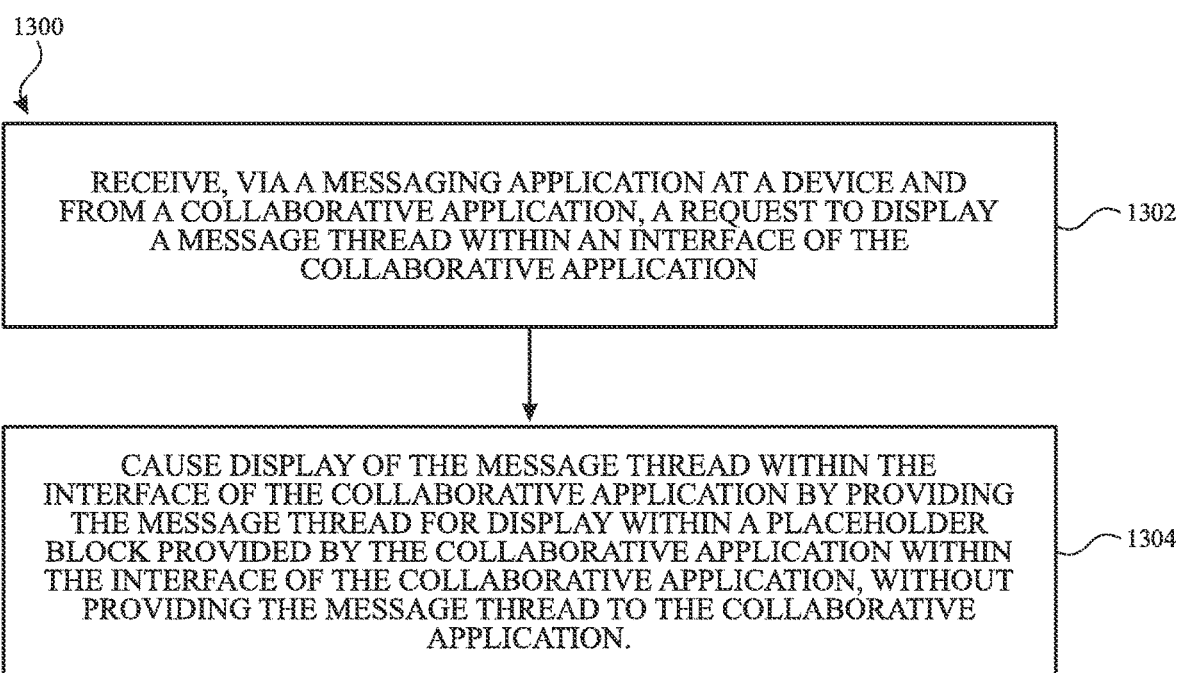

1400

1402 STORAGE

1404 SYSTEM MEMORY

1406 OUTPUT DEVICE INTERFACE

1408

ROM    1410

PROCESSOR(S)    1412

INPUT DEVICE INTERFACE    1414

NETWORK INTERFACE(S)    1416

*FIG. 14*

INTEGRATION BETWEEN MESSAGING SYSTEMS AND COLLABORATIVE APPLICATIONS

CROSS REFERENCE TO RELATED APPLICATIONS

This application claims the benefit of priority to U.S. Provisional Patent Application No. 63/349,033, entitled, "INTEGRATION BETWEEN MESSAGING SYSTEMS AND COLLABORATIVE APPLICATIONS", filed on Jun. 3, 2022, the disclosure of which is hereby incorporated herein in its entirety.

TECHNICAL FIELD

The present description relates generally to messaging systems, including, for example, integration between messaging systems and collaborative applications.

BACKGROUND

Messaging systems allow people in remote locations to send messages to and receive messages from each another. Collaborative applications allow people in remote locations to collaborate on documents. There are several shortcomings in how messaging systems and collaborative applications interface, integrate and deliver user experiences with one another.

BRIEF DESCRIPTION OF THE DRAWINGS

Certain features of the subject technology are set forth in the appended claims. However, for purpose of explanation, several embodiments of the subject technology are set forth in the following figures.

FIG. 8 illustrates a schematic view of a notification including a prompt to indicate whether access to the document should be modified in accordance with one or more implementations.

FIG. 9 illustrates a flow diagram of an example process for sending a message including a document link associated with a collaborative application in accordance with one or more implementations.

FIG. 10 illustrates a flow diagram of an example process for accessing a document associated with a collaborative application by selecting a document link included in a message received via a messaging system in accordance with one or more implementations.

FIG. 11 illustrates a flow diagram of an example process for sending a message indicating that a change has been made to a linked document associated with a collaborative application in accordance with one or more implementations.

FIG. 12 illustrates a flow diagram of an example process for facilitating modification of access to a document when access to a message thread has been modified in accordance with one or more implementations.

FIG. 13 illustrates a flow diagram of an example process for accessing a message thread about a document from within the document in accordance with one or more implementations.

FIG. 14 illustrates an electronic system with which one or more implementations of the subject technology may be implemented.

DETAILED DESCRIPTION

Figure 1:
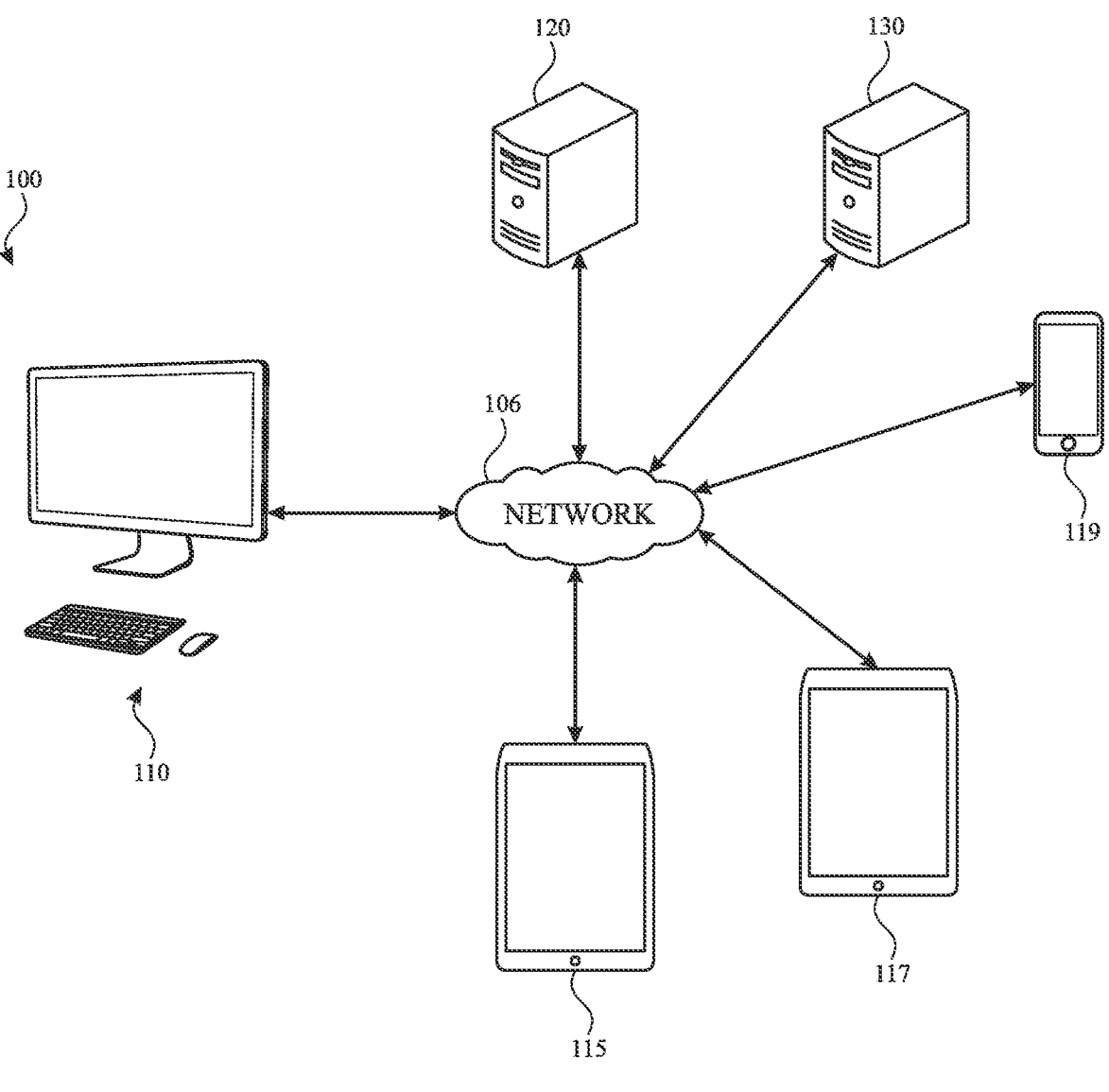
FIG. 1 illustrates an example network environment for messaging and collaboration in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Collaborative modules (e.g., collaborative applications) running on electronic devices may allow users of the electronic devices to collaborate with each other, such as on documents (e.g., text documents, spreadsheets, slideshows, etc.) Some collaborative applications may restrict access to certain documents so that only a defined set of users are able to access the document. The defined set of users may include, for example, only those users that have been granted permission to collaborate on the document. In some cases, such permission may have been granted by the user(s) that created the document and/or from other users that already have permission to collaborate on the document.

In some cases, the defined set of users may be able to modify (e.g., change) the document. For example, the defined set of users may each be able to add text, images, videos, audio, charts, tables, comments, or reactions to the document. As another example, the defined set of users may each be able to delete text, images, videos, audio, charts, tables, comments, or reactions from the document. As another example, the defined set of users may each be able to tag or mention other users from the defined set of users in the document.

In some cases, the defined set of users may change over time. For example, new users may be granted permission to collaborate on the document. As another example, users that previously had permission to collaborate on the document may have access to the document revoked. Such modifications to the defined set of users may be made, for example, by the other users that have permission to collaborate on the document.

Electronic devices such as personal computers (e.g., desktop computers and laptop computers), portable electronic devices (e.g., tablet computers and smartphones) and wearable devices (e.g., smartwatches, smart glasses etc.) often include applications that receive and process network data from another device and/or a server over a network. For example, a device may include an application associated with a messaging system that receives and processes electronic messages (e.g., including text, images, video content, audio content, and/or other objects).

In some scenarios, it can be desirable for collaborative applications to be integrated or in communication with messaging systems. For example, in some cases, a user collaborating on a document via a collaborative application may want to invite a friend or other contact to collaborate on the document, such as by sending, via a messaging system, a message to the device of a friend or other contact that includes a link to the document. However, if the friend or other contact receives the message and selects the link, the collaborative application may not allow the friend or other contact to access the document (e.g., unless the user has already, separately, added the friend or other contact as a collaborative user directly with the collaborative application, the friend is logged into the collaboration app under the same ID under which they were added by the user, and/or other various conditions). For example, the collaborative application may not recognize the friend or other contact as a user from the defined set of users. Moreover, because the messaging system and the collaborative application may be provided by different parties, it may be desirable for the user and/or the friend or other contact to be able to communicate with each other about the documents using the messaging system in a way that is integrated with the collaborative application, without revealing messaging system identifiers and/or messaging content to the collaborative application (such as to preserve the users' privacy) and/or without revealing collaborative application identifiers and/or collaborative content to the messaging system (such as to preserve the users' privacy).

In some cases, users collaborating on a document via a collaborative application may want a message to be automatically sent, via a messaging system, to a message thread associated with the document each time a change is made to the document. For example, if a user from the defined set of users makes a change to the document (i.e., modifications to the content of the document), it can be desirable for a message indicative of the change to automatically be displayed in the message thread. The participants in the message thread may, for example, include all or a subset of the defined set of users. However, if the messaging system and the collaborative application are not integrated or in communication with each other, the messaging system may be unaware when a change is made to a document. Accordingly, the messaging system may be unable to automatically display a message indicative of the change in a message thread.

In some cases, access to a message thread associated with a messaging system may be modified. For example, one or more participants may be added to or removed from the message thread. The message thread may be associated with a document that users are collaborating on via a collaborative application. It can be desirable for the defined set of users having access to the document via the collaborative application to be modified in a similar manner. For example, if a participant is added to the message thread, it can be desirable for that participant to also be granted access to the document within the collaborative application. Conversely, if a participant is removed from the message thread, it can be desirable for that participant's access to the document within the collaborative application to also be removed. However, if the messaging system and the collaborative application are not integrated or in communication with each other, the messaging system may be unable to prompt a modification to the defined set of users.

In some cases, a message thread associated with a document may include information that a user needs or desires in order to work on or update a document within a collaborative application. However, it can be undesirable or inefficient if the user has to continuously switch back and forth between the message thread and the collaborative application. Thus, it can be desirable for a user that is collaborating on a document via a collaborative application to be able to view a message thread associated with the document while also viewing the document. However, if the messaging system and the collaborative application are not integrated or in communication with each other, it may not be possible for the message thread and the document to be simultaneously displayed. Moreover, it may also be desirable for the user to communicate via the messaging system without exposing the content of the messaging conversation/thread to the collaborative application.

In accordance with one or more implementations of the subject technology, integration between messaging systems and collaborative applications, especially messaging systems and collaborative applications provided by distinct parties can be provided.

Aspects of the subject technology disclosed herein can be helpful, for example, by providing a mechanism for users collaborating on a document via a collaborative application to send, via a messaging system, a message to the device of a friend or other contact that includes a link to the document. When the friend or other contact receives the message and selects the link, the collaborative application may allow the friend or other contact to access the document.

Aspects of the subject technology also provide a mechanism by which messages indicative of changes made to a document within a collaborative application are automatically displayed in a message thread associated with a messaging system.

Aspects of the subject technology also provide a mechanism by which access to a document associated with a collaborative application can be easily modified in a manner that aligns with modifications made to the participants of a message thread.

Aspects of the subject technology also provide a mechanism by which a document and a message thread associated with the document can be simultaneously displayed. The document may be associated with a collaborative application and the message thread may be associated with a messaging system.

FIG. 1 illustrates an example network environment 100 in which integration between messaging systems and collaborative applications may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, an electronic device 117, an electronic device 119, one or more messaging servers 120, and one or more collaborative servers 130. The network 106 may communicatively (directly or indirectly) couple the electronic device 110, the electronic device 115, the electronic device 117, the electronic device 119, the messaging server(s) 120, and/or the collaborative server(s) 130. In one or more implementations, the network 106 may be an interconnected network of devices that may include, or may be communicatively coupled to, the Internet. For explanatory purposes, the network environment 100 is illustrated in FIG. 1 as including the electronic device 110, the electronic device 115, the electronic device 117, the electronic device 119, the messaging server(s) 120, and the collaborative server(s) 130; however, the network environment 100 may include any number of electronic devices and/or any number of servers communicatively coupled to each other directly or via network 106.

The electronic device 110 may be, for example, a desktop computer, a portable computing device such as a laptop computer, a smartphone, a peripheral device (e.g., a digital camera, headphones), a tablet device, standalone videoconferencing hardware, a wearable device such as a watch, a band, glasses and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 110 may include a messaging application and a collaborative application. In FIG. 1, by way of example, the electronic device 110 is depicted as a desktop computer. The electronic device 110 may be, and/or may include all or part of, the electronic system discussed below with respect to FIG. 14.

In one or more implementations, the electronic device 110 may provide the messaging application for obtaining and/or exchanging user communications data such as electronic messages (e.g., including text, images, video content, audio content, and/or other objects) over the network 106, such as with a corresponding messaging application that is installed and accessible at, for example, electronic device 115, electronic device 117, and/or electronic device 119. In one or more implementations, the electronic device 110 may provide the collaborative application for obtaining and/or exchanging collaborative document data over the network 106, such as with a corresponding collaborative application that is installed and accessible at, for example, electronic device 115, electronic device 117, and/or electronic device 119. Collaborative document data may include, for example, data associated with a document that multiple parties are collaborating on.

The electronic device 115 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 115 may include a messaging application and a collaborative application. In FIG. 1, by way of example, the electronic device 115 is depicted as a tablet computer. The electronic device 115 may be, and/or may include all or part of, the electronic system discussed below with respect to FIG. 14.

In one or more implementations, the electronic device 115 may provide or support the messaging application for obtaining and/or exchanging user communications data such as electronic messages (e.g., including text, images, video content, audio content, and/or other objects) over the network 106, such as with a corresponding messaging application that is installed and accessible at, for example, electronic device 110, electronic device 117, and/or electronic device 119. The messaging application may be any kind of communications application. In some variations, the messaging application may be an email client for communicating via a group email thread.

In one or more implementations, the electronic device 115 may provide the collaborative application for obtaining and/or exchanging collaborative document data over the network 106, such as with a corresponding collaborative application that is installed and accessible at, for example, electronic device 110, electronic device 117, and/or electronic device 119. Collaborative document data may include, for example, data associated with a document that multiple parties are collaborating on.

The electronic device 117 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 117 may include a messaging application and a collaborative application. In FIG. 1, by way of example, the electronic device 117 is depicted as a tablet computer. The electronic device 117 may be, and/or may include all or part of, the electronic system discussed below with respect to FIG. 14.

In one or more implementations, the electronic device 117 may provide the messaging application for obtaining and/or exchanging user communications data such as electronic messages (e.g., including text, images, video content, audio content, and/or other objects) over the network 106, such as with a corresponding messaging application that is installed and accessible at, such as with a corresponding conferencing module that is installed and accessible at, for example, electronic device 115, electronic device 110, and/or electronic device 119. In one or more implementations, the electronic device 117 may provide the collaborative application for obtaining and/or exchanging collaborative document data over the network 106, such as with a corresponding collaborative application that is installed and accessible at, for example, electronic device 115, electronic device 110, and/or electronic device 119. Collaborative document data may include, for example, data associated with a document that multiple parties are collaborating on.

The electronic device 119 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 119 may include a messaging application and a collaborative application. In FIG. 1, by way of example, the electronic device 119 is depicted as a smartphone. The electronic device 119 may be, and/or may include all or part of, the electronic system discussed below with respect to FIG. 14.

In one or more implementations, the electronic device 119 may provide the messaging application for obtaining and/or exchanging user communications data such as electronic messages (e.g., including text, images, video content, audio content, and/or other objects) over the network 106, such as with a corresponding messaging application that is installed and accessible at, for example, electronic device 115, electronic device 117, and/or electronic device 110. In one or more implementations, the electronic device 119 may provide the collaborative application for obtaining and/or exchanging collaborative document data over the network 106, such as with a corresponding collaborative application that is installed and accessible at, for example, electronic device 115, electronic device 117, and/or electronic device 110. Collaborative document data may include, for example, data associated with a document that multiple parties are collaborating on.

In one or more implementations, the messaging server(s) 120 may be located remote to the electronic device 110, the electronic device 115, the electronic device 117, and/or the electronic device 119. The messaging server(s) 120 may perform operations for managing secure exchange of user communications data, such as electronic messages, between various electronic devices such as the electronic device 110, the electronic device 115, the electronic device 117, and/or the electronic device 119. In one or more implementations, the messaging server(s) 120 may provide content (e.g., user communications data, media content, application content, or any other suitable data) that is to be processed at a participant device (e.g., the electronic device 110, the electronic device 115, the electronic device 117, the electronic device 119) by a messaging application (e.g., 208 shown in FIG. 2) of the participant device. Collectively, the messaging server(s) 120 and the messaging application may be referred to herein as a "messaging system."

In one or more implementations, the collaborative server(s) 130 may be located remote to the electronic device 110, the electronic device 115, the electronic device 117, and/or the electronic device 119. The collaborative server(s) 130 may perform operations for managing collaborative document data associated with documents. For example, the collaborative server(s) 130 may store data associated with documents that multiple parties (e.g., users of the electronic device 110, the electronic device 115, the electronic device 117, and/or the electronic device 119) can access via the network 106. In one or more implementations, the collaborative server(s) 130 may provide content (e.g., collaborative document data, media content, application content, or any other suitable data) that is to be processed at a participant device (e.g., the electronic device 110, the electronic device 115, the electronic device 117, the electronic device 119) by a collaborative application (e.g., 206 shown in FIG. 2) of the participant device. Collectively, the collaborative server(s) 130 and the collaborative application may be referred to herein as a "collaborative system."

Figure 2:
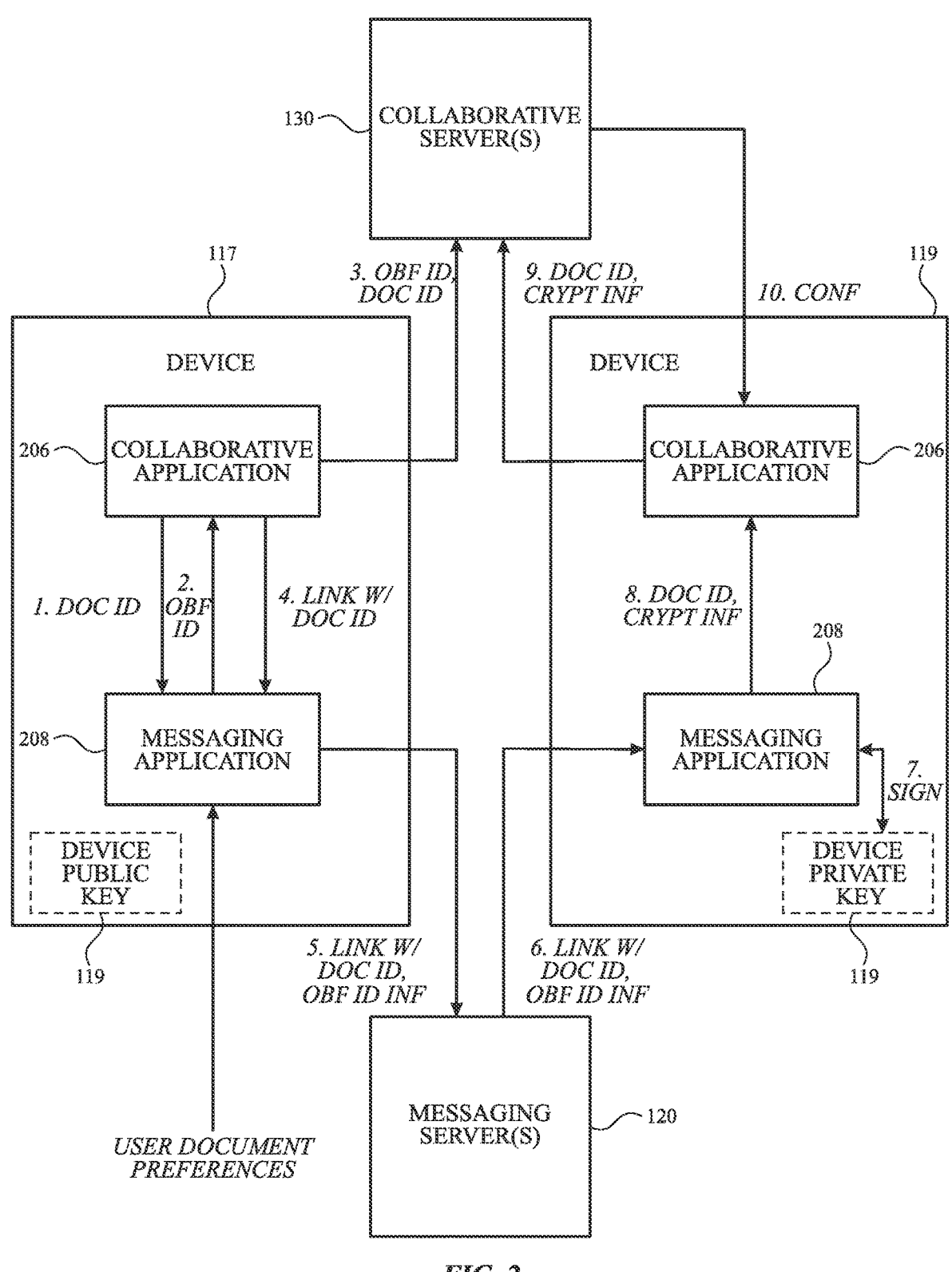
FIG. 2 illustrates a schematic diagram of first and second electronic devices exchanging a message including a document link associated with a collaborative application in accordance with one or more implementations.

FIG. 2 schematically illustrates various software features of two participant devices exchanging, via a messaging system, a message including a document link associated with a collaborative application. In the example of FIG. 2, the two participant devices are the electronic device 117 and the electronic device 119. As shown in FIG. 2, the electronic device 117 and the electronic device 119 may each include a collaborative application 206 and a messaging application 208. The collaborative application 206 and/or the messaging application 208 may each be, for example, an application that executes code on the electronic device 117 and/or the electronic device 119.

In one or more implementations the collaborative application 206 and the messaging application 208 are supported by and provided by the same party or entity (e.g., by a provider of an operating system for the electronic devices 117 and 119). In one or more implementations the collaborative application 206 and the messaging application 208 are supported by and provided by distinct parties or entities (e.g., the messaging application may be provided by the provider of the operating system for the electronic devices 117 and 119 and the collaborative application may be provided by an application provider different from the provider of the operating system, or the collaborative application may be provided by the provider of the operating system for the electronic devices 117 and 119 and the messaging application may be provided by an application provider different from the provider of the operating system). The collaborative application 206 and the messaging application 208 may be configured to communicate with each other via one or more APIs (Application Program Interfaces).

In one or more implementations, a user associated with the electronic device 117 may have access to a document associated with the collaborative application 206. For example, the user associated with the electronic device 117 may be a user among a defined set of users that has permission to view and/or change the document. Users outside of the defined set of users may not be able to view and/or change the document. The collaborative application 206 may be, for example, a document collaborative application for collaborating on a text document, a spreadsheet, and/or a slideshow.

For a variety of reasons, the user associated with the electronic device 117 may want to share access to the document, such as with a user associated with the electronic device 119, via the messaging application 208. To share access to the document, the user associated with the electronic device 117 may provide a user input indicating a request to share access to the document. For example, the user associated with the electronic device 117 may provide a request to the collaborative application 206 at the electronic device 117 to share access to the document. In one or more implementations, the user associated with the electronic device 117 may provide a request to the collaborative application 206 to share access to the document by opening the collaborative application 206 on the electronic device 117, accessing the document, and then selecting one or more buttons on an interface (e.g., a user interface) of the collaborative application 206.

In one or more implementations, the collaborative application 206 at the electronic device 117 may, at numeral 1, in response to receiving the request to share access to the document from the user associated with the electronic device 117, provide (e.g., send, forward, etc.) a document identifier associated with the document to the messaging application 208 at the electronic device 117. The messaging application 208 at the electronic device 117 may receive the document identifier from the collaborative application 206 at the electronic device 117.

In one or more implementations, the user associated with the electronic device 117 may be able to indicate one or more individuals or entities that he, she or they wants to share access to the document with. The user associated with the electronic device 117 may be able to do so by indicating one or more user accounts that the user associated with the electronic device 117 wants to share access to the document with. For example, if the user associated with the electronic device 117 wants to share access to the document with a user associated with the electronic device 119, the user associated with the electronic device 117 may indicate a user account associated with the electronic device 119. The user accounts may, for example, be user accounts associated with the messaging system (e.g., messaging application 208 and messaging server(s) 120).

In one or more implementations, after the user associated with the electronic device 117 indicates one or more user accounts with whom the user wants to share access to the document (e.g., by inputting messaging system identifiers of the one or more user accounts into the messaging application, such as by entering a phone number or an email address of the one or more user accounts into the messaging application), the messaging application 208 may generate, for each of the user accounts, an obfuscated identifier associated with the document identifier and contact information. If the user accounts are user accounts associated with the messaging system (e.g., messaging application 208 and messaging server(s) 120), each of the user accounts may be associated with contact information (e.g., the messaging system identifiers and/or device identifiers associated with the user accounts) accessible by the messaging system and inaccessible by the collaborative application 206. The obfuscated identifier may obfuscate the contact information from the collaborative application 206 so that the collaborative application 206 is not able to access some or all of the contact information.

In some variations, the obfuscated identifier associated with each user account may be based on a Merkle tree associated with at least one device associated with each user account and the document identifier. A Merkle tree is a tree in which each leaf node is labeled with the cryptographic hash of a data block, and each non-leaf node is labeled with the cryptographic hash of its child nodes' labels. In some variations, the obfuscated identifier associated with each user account may be based on a public key associated with at least one device associated with each user account. As examples, the obfuscated identifier may be the public key, a hash of the public key, a Merkle tree generated using the public key, or a hash of the Merkle tree. In some variations, the public key may be a general public key associated with a device or may be a public key generated specifically for the document ID, based on a combination of the general public key of the device and the document ID.

In some variations, a particular user account may be associated with multiple devices. This may occur, for example, if a user associated with the user account utilizes more than one device to access the messaging service. For example, a user associated with a single user account may utilize one or more of a mobile phone, a tablet, a laptop, a smart watch, etc. to send and receive electronic messages via the messaging service. If a particular user account is associated with multiple devices, the messaging application 208 may generate the obfuscated identifier associated with that user account by combining a respective public key associated with each of the multiple devices. The messaging application 208 may generate a Merkle tree based on the combination. The messaging application 208 may then generate a hash of the Merkle tree as the obfuscated identifier.

As shown in FIG. 2, at numeral 2, the messaging application 208 at the electronic device 117 may provide the obfuscated identifier associated with each user account (e.g., each user account for which a messaging system identifier was added to the messaging application as well as the user account corresponding to the electronic device 117) to the collaborative application 206 at the electronic device 117. In one or more implementations, the messaging application 208 may also provide the collaborative application 206 with a session identifier and/or a message thread identifier that identifies the messaging session and/or message thread via which the document link will be shared. The collaborative application 206 at the electronic device 117 may receive the obfuscated identifier associated with each user account from the messaging application 208 at the electronic device 117. In some variations, at numeral 3, the collaborative application 206 at the electronic device 117 may provide the obfuscated identifier associated with each user account to the collaborative server(s) 130 for storage. The collaborative server(s) 130 may receive and/or store the obfuscated identifier associated with each user account.

In one or more implementations, after receiving the obfuscated identifier associated with each user account from the messaging application 208 at the electronic device 117, the collaborative application 206 at the electronic device 117 may create a document link associated with the document. The collaborative application 206 may create the document link to effectuate sharing access to the document. The document link may, for example, be a reference to the document that a user can follow by clicking or tapping on the document link. In some variations, the document link, when selected at a device associated with a particular user account, may be configured to cause the device to determine that the particular user account is authorized to access the document link based on the obfuscated identifier and a signature provided by a private key of the device.

As shown in FIG. 2 at numeral 4, the collaborative application 206 at the electronic device 117 may provide the document link (e.g., along with the document identifier) to the messaging application 208 at the electronic device 117. The messaging application 208 at the electronic device 117 may receive the document link and the document identifier from the collaborative application 206 at the electronic device 117.

In one or more implementations, the messaging application 208 at the electronic device 117 may populate an initial message. The initial message may include an object associated with the document identifier. The object may, for example, be a data object created by the collaborative application 206 or the messaging application 208 at the electronic device 117. The object may include one or more of an image or UI icon associated with the document, a short description of the document, a title of the document, and/or any other attributes associated with the document.

In some variations, the object may include one or more user-selectable preferences for the document. For example, the user associated with the electronic device 117 may be presented with one or more collaboration sharing options that govern information shared between the messaging system and the collaborative application 206. As non-limiting examples, the collaboration sharing options may indicate whether user associated with the electronic device 117 wants the user associated with the electronic device 119 to be able to view but not modify the document, whether user associated with the electronic device 117 wants the user associated with the electronic device 119 to be able to view and modify the document, or whether user associated with the electronic device 117 wants the user associated with the electronic device 119 to be able to have re-sharing privileges to add/remove other collaborators.

In some variations, each of the users that has permission to access the document associated with the collaborative application 206 may be associated with a user account that is associated with the collaborative application 206. For example, the user associated with the electronic device 117 and/or the user associated with the electronic device 119 may be associated with a user account that is associated with the collaborative application 206. If the user accounts are user accounts associated with the collaborative application 206, each of the user accounts may be associated with contact information (e.g., the collaborative application identifiers and/or device identifiers associated with the user accounts) accessible by the collaborative application 206 and inaccessible by the messaging system. By utilizing the obfuscated identifier, such as in the manner shown in FIG. 2, the messaging system may not be able to access some or all of the contact information.

Figure 3:
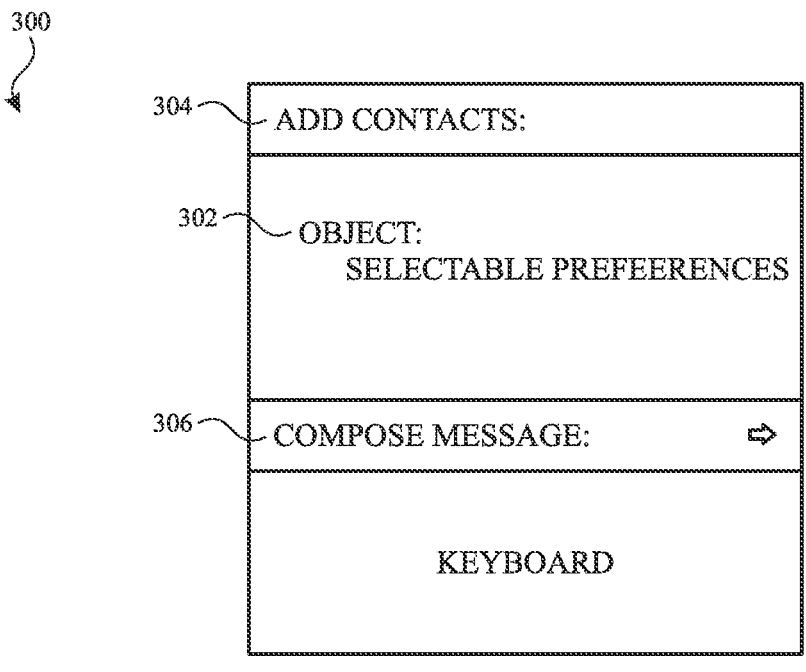
FIG. 3 illustrates a schematic view showing a message populated by a messaging system, the message including a document link associated with a collaborative application, in accordance with one or more implementations.

FIG. 3 illustrates an example initial message 300 populated by the messaging application 208. As shown in FIG. 3, the initial message 300 includes the object 302. The object 302 includes one or more user-selectable preferences for the document. The one or more user accounts with whom the user associated with the electronic device 117 wants to share access to the document may be indicated in a header 304 corresponding to the initial message 300 (e.g., by entering phone numbers or email addresses into the header 304). In some variations, the user associated with the electronic device 117 may add additional information to the initial message 300. For example, the user associated with the electronic device 117 may be able to add additional message data (e.g., including text, images, video content, audio content, and/or other objects) to the initial message 300 in a footer 306 of the initial message. To add the additional information to the initial message 300, the user may, for example, utilize a keyboard, voice control, or any other suitable means of entering message data in the footer 306. In some variations, the initial message 300 is populated in response to receiving the document identifier before the obfuscated identifier(s) are generated and/or before the link is generated. In these variations, the obfuscated identifier(s) may be generated and provided to the collaborative application, and the link may be returned to the messaging application 208 for inclusion in the initial message in response a user input requesting to send the populated initial message. In other variations, the initial message is populated in response to receiving the document link and the document identifier, and the object may include the document link for accessing the document associated with the document identifier. In yet other variations, the foregoing steps for sharing the document may occur subsequent to a messaging thread having been established between the user associated with the electronic device 117 and another user, in which case historical message texts exchanged would be near or around the object 302.

Referring back to FIG. 2, at numeral 5, the messaging application 208 at the electronic device 117 may provide the document link with the document identifier, along with information indicative of the obfuscated identifier(s), to the messaging server(s) 120. The information indicative of the obfuscated identifier(s) may include information for recreating the obfuscated identifier(s) and/or the obfuscated identifier(s). For example, the messaging application 208 at the electronic device 117 may (e.g., in response to receiving a send instruction from the user of the electronic device 117) provide the initial message and information indicative of the obfuscated identifier(s), to the messaging server(s) 120. The messaging server(s) 120 may receive the initial message and information indicative of the obfuscated identifier(s), such as in an encrypted form for transmission to one or more other electronic devices.

In one or more implementations, the messaging server(s) 120 may be configured to send the initial message and the information indicative of the obfuscated identifier(s) to the user accounts specified by the user associated with the electronic device 117. For example, as shown in FIG. 2 at numeral 6, the messaging server(s) 120 may send the document link with the document identifier, along with information indicative of the obfuscated identifier(s), to the messaging application 208 at the electronic device 119. The messaging application 208 at the electronic device 119 may receive the initial message along with information indicative of the obfuscated identifier(s).

Figure 4:
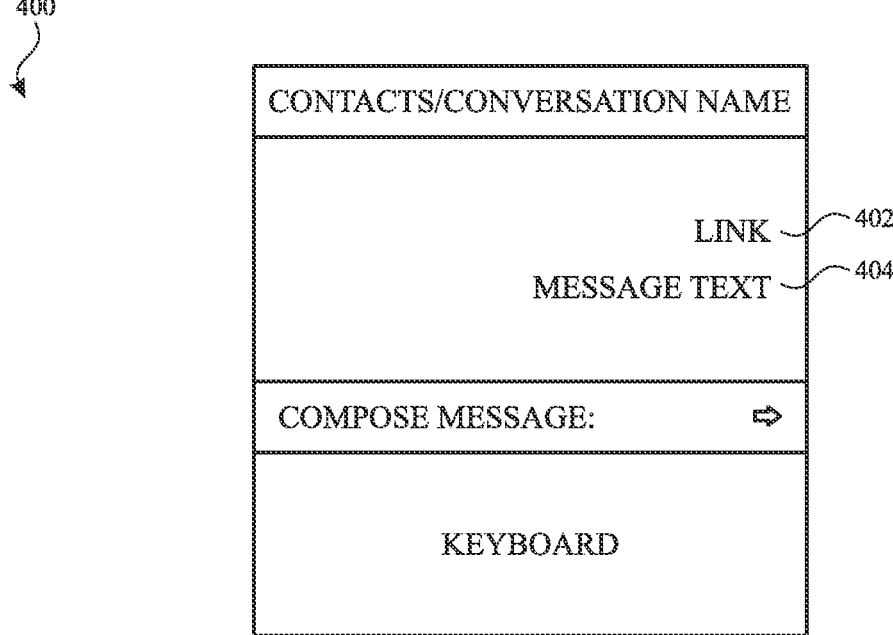
FIG. 4 illustrates a schematic view of a received message including a document link associated with a collaborative application in accordance with one or more implementations.

FIG. 4 illustrates an example initial message 400 received by the messaging application 208 at the electronic device 119. The initial message 400 may be displayed on a UI of the messaging application 208 at the electronic device 119. As shown in FIG. 4, the initial message 400 includes a document link 402. The document link 402 may, when selected by a user associated with the electronic device 119, be configured to cause the electronic device 119 to perform operations for determining that the user account associated with the user is authorized to access the document link. If the user associated with the electronic device 117 added additional information to the initial message before sending the initial message, such additional information may appear as message text 404. The message text 404 may include text, images, video content, audio content, and/or other objects. In scenarios where the user associated with the electronic device 119 and the user associated with the electronic device 117 had a messaging thread established prior to the document link 402 being shared, historical text of that messaging thread would be displayed near or around document link 402 and messaging text 404.

Referring back to FIG. 2, in some variations, a user associated with the electronic device 119 may select the document link via a UI of the messaging application 208 at the electronic device 119. For example, the user may click on the document link, such as with a finger, stylus, or any other suitable means of selecting a document link on a UI. If the user associated with the electronic device 119 selects the document link, the messaging application 208 at the electronic device 119 may obtain the information indicative of the obfuscated identifier from the initial message.

As shown in FIG. 2 at numeral 7, the electronic device 119 may sign the information indicative of the obfuscated identifier, and/or information derived therefrom, using a private key of the electronic device 119. At numeral 8, the messaging application 208 at the electronic device 119 may send the document identifier and cryptographic information (e.g., the obfuscated identifier, information derived from the obfuscated identifier, a signed obfuscated identifier, signed information derived from the obfuscated identifier, and/or the signed information indicative of the obfuscated identifier) to the collaborative application 206 at the electronic device 119. The signed information indicative of the obfuscated identifier may, for example, be a device-specific (e.g., specific to electronic device 119) portion of the information indicative of the obfuscated identifier. In some embodiments, messaging application 208 may just provide the obfuscated identifier to the collaborative application 206 in response to verifying that user associated with electronic device 119 should be given access to the document link based on the private key of electronic device 119. The collaborative application 206 may receive the document identifier and cryptographic information, such as from the messaging application 208 at the electronic device 119.

In one or more implementations, the cryptographic information may be utilized by the collaborative server(s) 130 to recreate the obfuscated identifier. At numeral 9, the collaborative application 206 at the electronic device 119 may provide the document identifier and the cryptographic information to the collaborative server(s) 130. The collaborative application 206 at the electronic device 119 may additionally provide the public key of the electronic device 119 to the collaborative server(s) 130, the public key of the electronic device 119 may be the obfuscated identifier and/or the public key may be part of the cryptographic information. The collaborative server(s) 130 may receive the document identifier and the signed information indicative of the obfuscated identifier. The collaborative server(s) 130 may additionally receive the public key of the electronic device 119.

In some variations, the collaborative server(s) 130 may recreate the obfuscated identifier associated with the user account associated with the electronic device 119 using the signed information indicative of the obfuscated identifier and the public key of the electronic device 119 which may, in one or more implementations, be included in the signed information indicative of the obfuscated identifier. For example, the public key of the electronic device 119 may be utilized for the recreation of the obfuscated identifier, and not just for verifying the signature associated with the signed information indicative of the obfuscated identifier. The collaborative server(s) 130 may compare the recreated obfuscated identifier with the obfuscated identifier received at numeral 3.

In some variations, the collaborative server(s) 130 may compare the recreated obfuscated identifier to the stored obfuscated identifiers to determine if the electronic device 119 is authorized to access the document associated with the document identifier. The stored obfuscated identifiers may, for example, include the obfuscated identifiers provided by the collaborative application 206 at the electronic device 117 to the collaborative server(s) 130 for storage at numeral 3. If the collaborative server(s) 130 determines that the recreated obfuscated identifier corresponds to (e.g., matches, is the same as) a stored obfuscated identifier, the collaborative server(s) 130 may determine that the electronic device 119 is authorized to access the document. At numeral 10, the collaborative server(s) 130 may provide a confirmation to the collaborative application 206 at the electronic device 119. The confirmation may indicate to the electronic device 119 that the electronic device 119 is authorized to access the document. The collaborative application 206 at the electronic device 119 may receive the confirmation.

In one or more implementations, in response to receiving the confirmation from the collaborative server(s) 130, the collaborative application 206 at the electronic device 119 may cause display of the document on an interface (e.g., a user interface) of the collaborative application 206. For example, electronic device 119 may surface an interface (e.g., a user interface) of the collaborative application 206 for display of the document in response to determining that the electronic device 119 is authorized to access the document. In one or more implementations, the user associated with the electronic device 119 may be requested to separately authenticate a collaborative account with the collaborative application 206, before or after the collaborative server(s) 130 confirm that that user is authorized to access the document. The user associated with the electronic device 119 may view and/or modify the document via the interface (e.g., a user interface). In one or more implementations, the collaborative server(s) 130 and/or the collaborative application 206 may store an association between the obfuscated identifier and the collaborative account the user authenticated with.

Conversely, if the collaborative server(s) 130 determines that the recreated obfuscated identifier does not correspond to (e.g., does not match, is not the same as) a stored obfuscated identifier, the collaborative server(s) 130 may determine that the electronic device 119 is not authorized to access the document. The collaborative server(s) 130 may not send a confirmation to the collaborative application 206 at the electronic device 119. The document may not be displayed on an interface (e.g., a user interface) of the collaborative application 206. In some variations, the collaborative server(s) 130 may send a message to the collaborative application 206 indicating that the electronic device 119 is not authorized to access the document to the collaborative application 206 at the electronic device 119.

Figure 5:
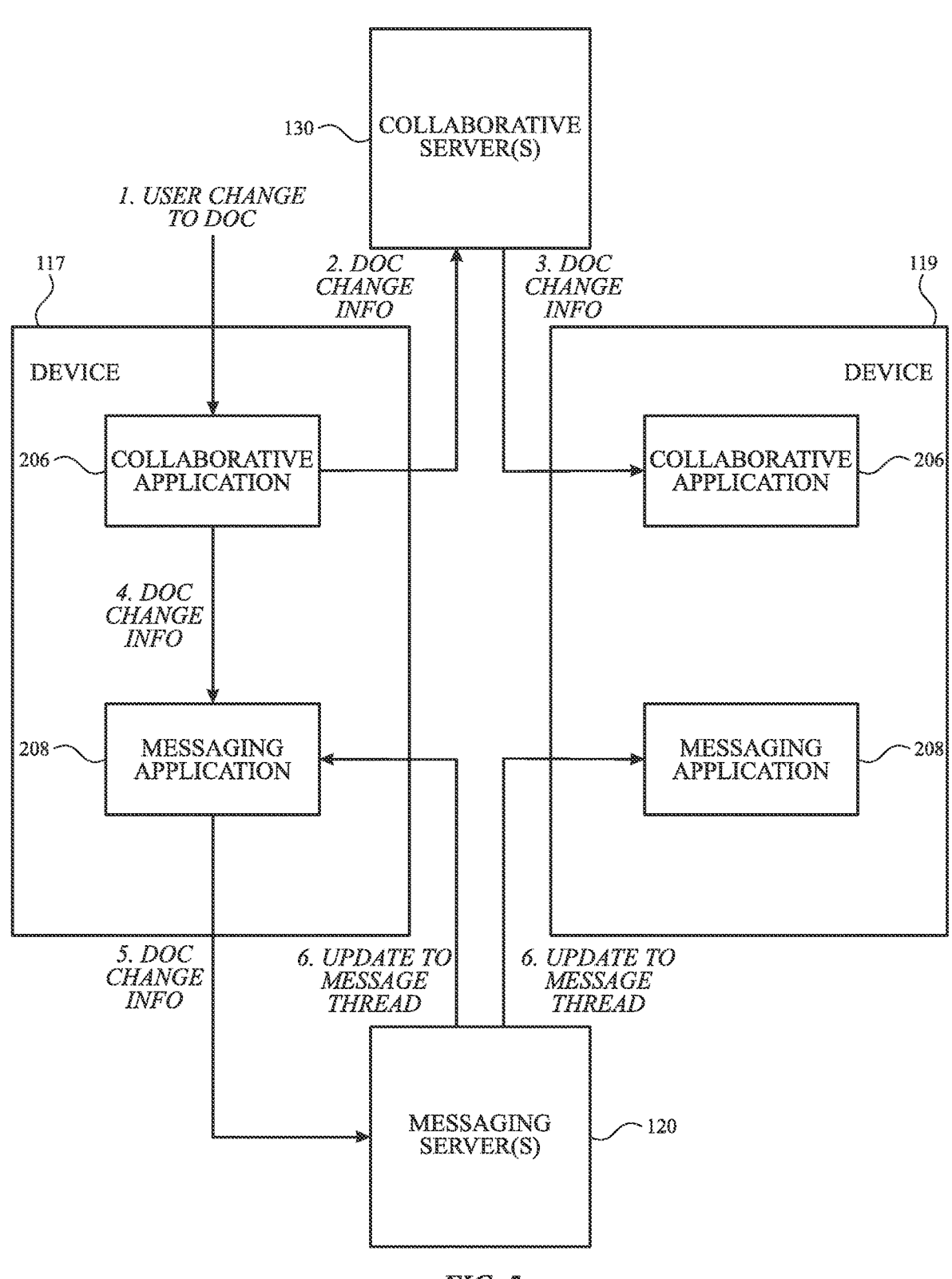
FIG. 5 illustrates a schematic diagram of first and second electronic devices exchanging a message indicating that a change has been made to a linked document associated with a collaborative application in accordance with one or more implementations.

FIG. 5 schematically illustrates various software features of two participant devices exchanging, via a messaging system, a message indicating that a change has been made to a linked document associated with a collaborative application. As described above, users collaborating on a document via a collaborative application may want a message to be automatically sent, via a messaging system, to a message thread associated with the document if a change is made to the document.

In the example of FIG. 5, the two participant devices are the electronic device 117 and the electronic device 119. As shown in FIG. 5, the electronic device 117 and the electronic device 119 may each include the collaborative application 206 and the messaging application 208. The collaborative application 206 and/or the messaging application 208 may each be, for example, an application that executes code on the electronic device 117 and/or the electronic device 119.

In one or more implementations the collaborative application 206 and the messaging application 208 are supported by and provided by distinct parties or entities. The collaborative application 206 and the messaging application 208 may be configured to communicate with each other via one or more APIs (Application Program Interfaces).

In one or more implementations, a user associated with the electronic device 117 and a user associated with the electronic device 119 may each have access to a document associated with the collaborative application 206. For example, the user associated with the electronic device 117 and the user associated with the electronic device 119 may be users among a defined set of users that has permission to view and/or change the document. Users outside of the defined set of users may not be able to view and/or change the document.

In one or more implementations, the user associated with the electronic device 117 and a user associated with the electronic device 119 may each be associated with a particular respective user account within the messaging system (e.g., the messaging application 208 and the messaging server(s) 120). The user associated with the electronic device 117 and the user associated with the electronic device 119 may each utilize their respective user accounts to exchange electronic messages with other user accounts via the messaging system.

In some variations, the user account associated with the electronic device 117 and the user account associated with the electronic device 119 may both be participants in a message thread associated with the messaging system. The message thread may be associated with the document. The message thread may include one or more electronic messages (e.g., including text, images, video content, audio content, and/or other objects) associated with the document. For example, the user account associated with the electronic device 117 and the user account associated with the electronic device 119 may exchange messages associated with the document in the message thread. The message thread may optionally include other participant user accounts. If the message thread includes other participant user accounts, these other participant user accounts may be associated with users that also have access to the document associated with the collaborative application 206.

In other variations, the user account associated with the electronic device 119 may be a participant in the message thread associated with the document. However, the user account associated with the electronic device 117 may not be a participant in the message thread. For example, the user associated with the electronic device 117 may have access to the document in the collaborative application 206 but may not have access to the message thread associated with the document in the messaging system.

In one or more implementations, multiple user accounts may be participants in the message thread. As described above with regard to FIG. 2, each of the plurality of user accounts may have an obfuscated identifier generated by the messaging system for use by the collaborative application 206. In some variations, an initial message exchanged between the multiple user accounts with the document link in the message thread may establish, for the collaborative application 206, the obfuscated identifiers that will be associated with the document link. In some variations, the collaborative application 206 may verify that a device accessing the document link corresponds to at least one of the obfuscated identifiers based on a cryptographic hash associated with the obfuscated identifier that was generated by the messaging system.

For a variety of reasons, the user associated with the electronic device 117 may make a change to (e.g., modify) the document. As shown in FIG. 5, at numeral 1, the user associated with the electronic device 117 may make a change to the document. To make a change to the document, the user associated with the electronic device 117 may add at least one of text, an image, a video, audio, a chart, a table, a comment, or a reaction to the document. Additionally, or alternatively, to make a change to the document, the user associated with the electronic device 117 may delete at least one of text, an image, a video, audio, a chart, a table, a comment, or a reaction from the document. Additionally, or alternatively, to make a change to the document, the user associated with the electronic device 117 may mention or tag another user from the defined set of users in the document, such as at a particular location in the document.

In one or more implementations, at numeral 2, the collaborative application 206 at the electronic device 117 may provide information or data associated with the change(s) to the document to the collaborative server(s) 130. The collaborative server(s) 130 may receive the information or data associated with the change(s) to the document. The collaborative server(s) 130 may utilize the information or data associated with the change(s) to the document to cause the change(s) to the document to be implemented, so that other users of the defined set of users can view the document, including the change(s), from their respective electronic devices. For example, at numeral 3, the collaborative server(s) 130 may provide the information or data associated with the change(s) to the document to the collaborative application 206 at the electronic device 119 so that a user associated with the electronic device 119 can view the document, including the change(s), if the user associated with the electronic device 119 has access to the document.

In the example of FIG. 5, at numeral 4, the collaborative application 206 at the electronic device 117 may provide the information or data associated with the change(s) to the document to the messaging application 208 at the electronic device 117 (e.g., without user interaction requesting that the information or data be provided to the messaging application). In one or more implementations, the collaborative application 206 may provide the information or data associated with the change(s) to the messaging application 208 in conjunction with the document identifier, a session identifier and/or thread identifier previously received from the messaging application 208, and/or any other identifier that the messaging application 208 may use to identify the corresponding message thread.

The messaging application 208 at the electronic device 117 may receive the information or data associated with the change(s) to the document. In some variations, messaging application 208 at the electronic device 117 may receive the information or data associated with the change(s) to the document after providing, to the collaborative application 206, an obfuscated identifier generated by the messaging system and associated with the at least one user account and the document link, as described above with regard to FIG. 2.

In some variations, the information or data associated with the change(s) to the document indicates that the user associated with the electronic device 117 is responsible for making the change(s) to the document. For example, if a user account of the user associated with the electronic device 117 is a participant in a message thread associated with the document, the information or data associated with the change(s) to the document may indicate that the user associated with the electronic device 117 is responsible for making the change(s) to the document, such as by including the obfuscated identifier (e.g., public key) associated with that user account. In some variations, the information or data associated with the change(s) to the document may not indicate that the user associated with the electronic device 117 is responsible for making the change(s) to the document. For example, if a user account of the user associated with the electronic device 117 is not a participant in a message thread associated with the document, the information or data associated with the change(s) to the document may not indicate that the user associated with the electronic device 117 is responsible for making the change(s) to the document.

At numeral 5, the messaging application 208 at the electronic device 117 may provide information or data associated with the change(s) to the document to the messaging server(s) 120 (e.g., in a message indicative of the change(s) to the document). The messaging server(s) 120 may receive the message indicative of the change(s) to the document and/or update the message thread associated with the document by pushing the message indicative of the change(s) to the message thread. For example, at numeral 6, the messaging server(s) 120 may update the message thread associated with the document via the messaging application 208 at the electronic device 117 and the electronic device 119. The user associated with the electronic device 119 may be able to view the message in the message thread via a UI of the messaging application 208 at the electronic device 119. If a user account of the user associated with the electronic device 117 is also a participant in a message thread, the user associated with the electronic device 117 may likewise be able to view the message in the message thread via a UI of the messaging application 208 at the electronic device 117.

Figure 6:
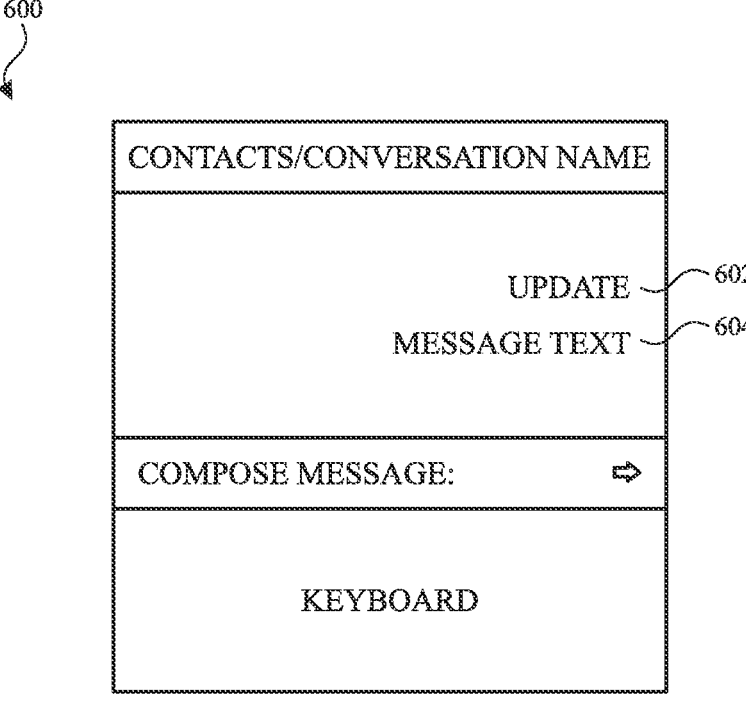
FIG. 6 illustrates a schematic view of a message indicating that a change has been made to a linked document associated with a collaborative application in accordance with one or more implementations.

FIG. 6 illustrates an example update message 600 indicative of change(s) made to a document. The message 600 may be displayed in a message thread associated with the document on a UI of the messaging application 208, such as at the electronic device 117 and/or the electronic device 119. As shown in FIG. 6, the update message 600 includes an update 602. The updated 602 may indicate the change(s) made to the document. As one non-limiting example, the update 602 may indicate if text, an image, a video, audio, a chart, a table, a comment, or a reaction was added to or deleted from the document. As another non-limiting example, the update 602 may indicate if a user was mentioned or tagged in the document. The update message 600 may optionally include message text 604. The message text 604 may indicate additional information, including text, images, video content, audio content, and/or other objects.

Referring back to FIG. 5, in some variations, the message indicative of the change(s) to the document may indicate that the user associated with the electronic device 117 is responsible for making the change(s) to the document. For example, if at numeral 4, the information or data associated with the change(s) to the document provided to the messaging application 208 at the electronic device 117 indicated that the user associated with the electronic device 117 is responsible for making the change(s) to the document, the message indicative of the change(s) to the document may indicate that the user associated with the electronic device 117 is responsible for making the change(s) to the document.

In other variations, the message indicative of the change(s) to the document may not indicate that the user associated with the electronic device 117 is responsible for making the change(s) to the document. For example, if at numeral 4, the information or data associated with the change(s) to the document provided to the messaging application 208 at the electronic device 117 did not indicate that the user associated with the electronic device 117 is responsible for making the change(s) to the document, the message indicative of the change(s) to the document may not indicate that the user associated with the electronic device 117 is responsible for making the change(s) to the document. Instead, the message indicative of the change(s) to the document may indicate that an anonymous user is responsible for making the change(s) to the document.

In some variations, a particular user account associated with the message thread may be associated with multiple devices. This may occur, for example, if a user associated with the user account utilizes more than one device to access the messaging service. For example, a user associated with a single user account may utilize both the electronic device 119 and the electronic device 115 to send and receive electronic messages via the messaging service. If a particular user account associated with the message thread is associated with multiple devices, the messaging server(s) 120 may update the message thread associated with the document by Distributing the update to the message thread to each of the multiple devices. The messaging service may display the update to the message thread at an earliest one of the multiple devices to display the message thread (and/or to be viewed by the user) after receiving the update to the message thread. The messaging service may forego displaying the update to the message thread at a subsequent one of the multiple devices to display message thread after receiving the update to the message thread. In this manner, the same user may not need to view the same message indicative of the change(s) to the document on all of their different devices. Rather, the same user may only need to view the message indicative of the change(s) to the document on one device.

In one or more implementations, the update to the message thread may be selectable. For example, the updated to the message thread may be a selectable link. As discussed above, the user associated with the electronic device 119 may be able to view the message including the update in the message thread via a UI of the messaging application 208 at the electronic device 119. The user associated with the electronic device 119 may be able to select the update (e.g., update 602 of FIG. 6), such as by clicking on the update with a finger, stylus, or any other suitable means of selecting a UI element. If the user associated with the electronic device 119 selects the update, the messaging system may be configured to surface an interface (e.g., a user interface) of the collaborative application 206 for display of the document associated with the message thread. In this manner, the user associated with the electronic device 119 may be able to efficiently view the document, including the change(s) made to the document by the user associated with the electronic device 117.

Figure 7:
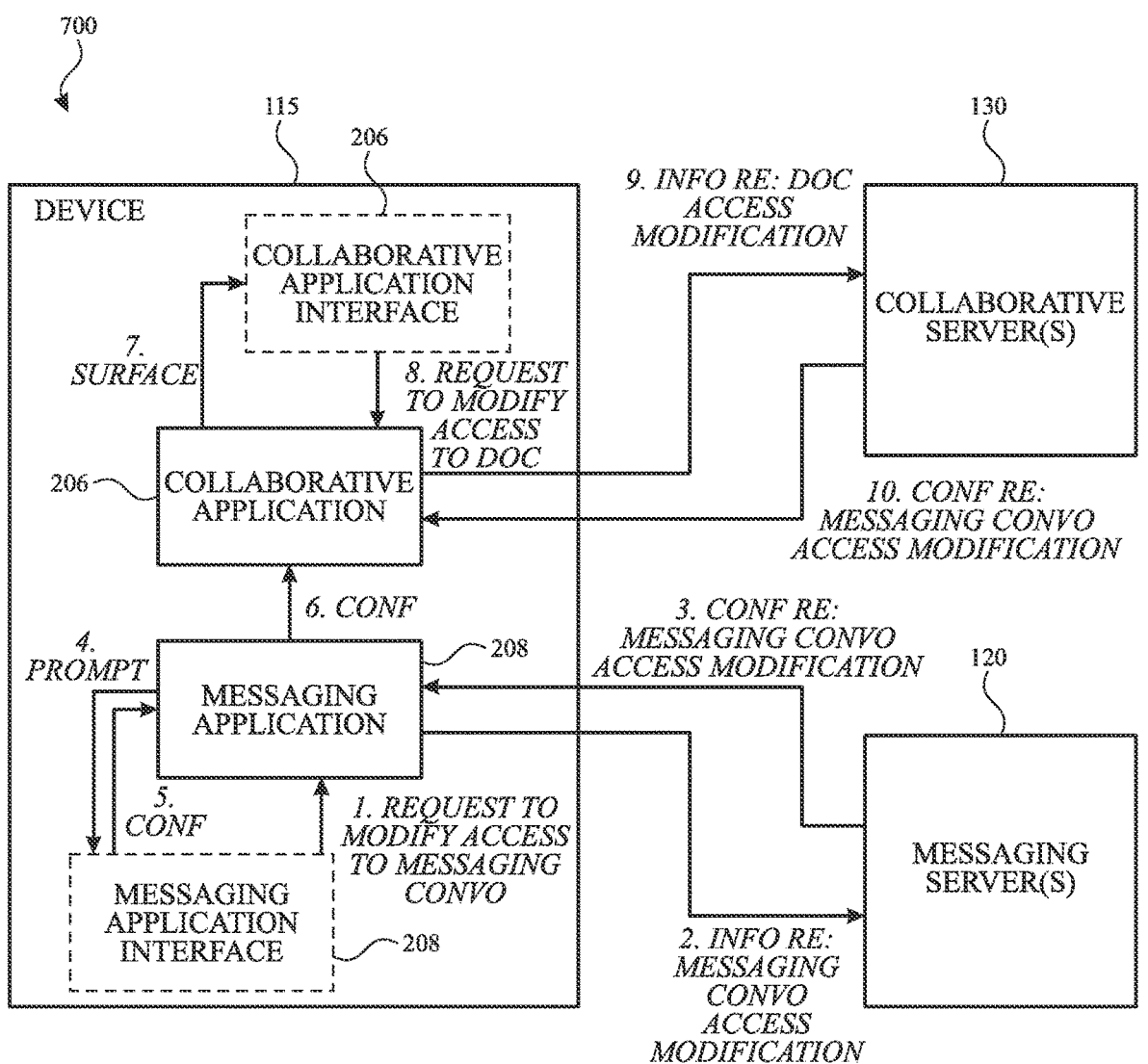
FIG. 7 illustrates a schematic diagram of access to a document being modified when access to a message thread associated with the document has been modified by an electronic device in accordance with one or more implementations.

FIG. 7 illustrates a schematic diagram of access to a document being modified when access to a message thread associated with the document has been modified by an electronic device in accordance with one or more implementations. As described above, access to a message thread may be modified. For example, one or more participant user accounts may be added to or removed from the message thread. The message thread may be associated with a document that users are collaborating on via a collaborative application. It can be desirable for the defined set of users having access to the document via the collaborative application to be modified in a similar manner.

In the example of FIG. 7, the electronic device 115 may include the collaborative application 206 and the messaging application 208. The collaborative application 206 and/or the messaging application 208 may each be, for example, an application that executes code on the electronic device 115.

In one or more implementations the collaborative application 206 and the messaging application 208 are supported by and provided by distinct parties or entities. The collaborative application 206 and the messaging application 208 may be configured to communicate with each other via one or more APIs (Application Program Interfaces).

In one or more implementations, a user associated with the electronic device 115 may have access to a document associated with the collaborative application 206. For example, the user associated with the electronic device 115 may be a user among a defined set of users that has permission to view and/or change the document. Users outside of the defined set of users may not be able to view and/or change the document.

In one or more implementations, the user associated with the electronic device 115 may be associated with a particular user account within the messaging system (e.g., the messaging application 208 and the messaging server(s) 120). The user associated with the electronic device 115 may utilize the user account to exchange electronic messages with other user accounts via the messaging system.

In some variations, the user account associated with the electronic device 115 may be a participant in a message thread associated with the messaging system. The message thread may be associated with the document. For example, the message thread may include a link to the document that was sent within the message thread. The message thread may include one or more electronic messages (e.g., including text, images, video content, audio content, and/or other objects) associated with the document. For example, the user account associated with the electronic device 115 may exchange messages associated with the document in the message thread with other user accounts. These other user accounts may be associated with users that also have access to the document associated with the collaborative application 206.

For a variety of reasons, the user account associated with the electronic device 115 may modify access to the message thread associated with the document. As shown in FIG. 7, at numeral 1, the user account associated with the electronic device 115 may send to the messaging application 208 a request to modify access to the message thread. The user account may send the request via an interface (e.g., a user interface) of the messaging application 208. The messaging application 208 may receive the request. By way of non-limiting example, the request to modify access to the message thread may be a request to add at least one participant user account to the message thread or may be a request to remove at least one participant user account from the message thread.

In the example of FIG. 7, at numeral 2, the messaging application 208 may send information indicative of the request to the messaging server(s) 120. The information indicative of the request may include, for example, the user account(s) that the user account associated with the electronic device 115 wants to add to or delete from the message thread. The messaging server(s) 120 may receive the information indicative of the request and utilize the information indicative of the request to implement the changes to the message thread access. For example, the messaging server(s) 120 may utilize the information indicative of the request to add the proper user account(s) to the message thread or delete the proper user account(s) from the message thread. If the messaging server(s) 120 implements the changes to the message thread access, such changes may be reflected on all of the devices associated with all user accounts that still have access to the message thread. At numeral 3, the messaging server(s) 120 may provide confirmation that the request has been fulfilled to the messaging application 208 at the electronic device 115 and/or to messaging applications at electronic devices associated with other user accounts in the message thread. The messaging application 208 at the electronic device 115 may receive the confirmation that the request has been fulfilled.

In the example of FIG. 7, at numeral 4, the messaging application 208 may display a notification, such as in response to receiving the request from the user account associated with the electronic device 115. The notification may be displayed on an interface (e.g., a user interface) of the messaging application 208 at the electronic device 115. The notification may include a prompt asking whether access to the document should be similarly modified. As a non-limiting example, if the user account associated with the electronic device 115 requested that "user account A" be added as a participant to the message thread, the prompt may ask whether the user associated with "user account A" should also be given access to the document in the collaborative application 206. As another non-limiting example, if the user account associated with the electronic device 115 requested that "user account B" be deleted as a participant in the message thread, the prompt may ask whether access to the document in the collaborative application 206 should be revoked from the user associated with "user account B." In one or more implementations, the messaging application 208 may forgo displaying the notification and may automatically instruct and/or request that the collaborative application 206 modify access in accordance with the modification to the message thread.

FIG. 8 illustrates an example notification 800 including a prompt to indicate whether access to the document should be modified. The notification 800 includes a prompt 802. The prompt 802 may ask whether access to the document should be modified. The notification 800 includes a "yes" option 804*a* and a "no" option 804*b*. The options 804*a-b* may be selectable, so that a user can indicate whether access to the document should be modified. For example, if the user associated with the electronic device 115 wants access to the document to be modified, the user associated with the electronic device 115 may select the option 804*a* by clicking on option 804*a*, such as with a finger, stylus, or any other suitable means of selecting a UI element. As another example, if the user associated with the electronic device 115 does not want access to the document to be modified, the user associated with the electronic device 115 may select the option 804*b* by clicking on option 804*b*, such as with a finger, stylus, or any other suitable means of selecting a UI element.

Referring back to FIG. 7, in some variations, the messaging application 208 may receive, in response to the notification and from the user account, a user indication that access to the document should be modified. At numeral 5, the messaging application 208 may receive a confirmation that the user associated with the electronic device 115 wants access to the document to be modified (e.g., the user associated with the electronic device 115 selected the option 804*a* of FIG. 8). In the example of FIG. 7, at numeral 6, the messaging application 208 may provide the confirmation to the collaborative application 206. In response to receiving the confirmation of the user indication that access to the document should be modified, at numeral 7, the collaborative application 206 at the electronic device 115 may surface an interface (e.g., a user interface) of the collaborative application for display of the document.

In one or more implementations, the user associated with the electronic device 115 may modify access to the document via the surfaced interface. At numeral 8, the user associated with the electronic device 115 may send, via the surfaced interface of the collaborative application 206 and to the collaborative application 206, a request to modify access to the document. The request may include, for example, the document identifier and/or an obfuscated identifier, such as the obfuscated identifier described above with regard to FIG. 2, associated with the requesting user and/or the user for which access is being modified. The collaborative application 206 may receive the request to modify access to the document.

In some variations, the request to modify access to the document may be similar to the earlier request to modify access to the message thread. As a non-limiting example, if the user account associated with the electronic device 115 added "user account A" a participant to the message thread, the request to modify access to the document may be a request to give the user associated with "user account A" access to the document in the collaborative application 206. As another non-limiting example, if the user account associated with the electronic device 115 removed "user account B" from the message thread, the request to modify access to the document may be a request to revoke access to the document for the user associated with "user account B."

In one or more implementations, the messaging application 208 may identify the user account to be added or removed from access to the document in the collaborative application 206 by using the obfuscated identifier corresponding to the user account. The collaborative application 206 may then identify the user account associated with the obfuscated identifier when a user is being removed, or may use the obfuscated identifier to verify the user being added in accordance with FIG. 2 above.

In one or more implementations, the messaging application 208 may also provide the collaborative application 206 with the obfuscated identifier of the user of the electronic device 115 that is requesting the change such that the collaborative application 206 can confirm that the user is authorized to make the change. For example, if the obfuscated identifier is or includes, or is derived from, a public key of the electronic device 115, the electronic device 115 may sign the obfuscated identifier with the corresponding private key. In this manner, the collaborative application 206 can obtain and/or derive the public key via the obfuscated identifier and verify the signature using the public key thereby confirming that the user of the electronic device 115 is requesting the change.

In the example of FIG. 7, at numeral 9, the collaborative application 206 may provide information or data associated with the request to modify access to the document to the collaborative server(s) 130. The collaborative server(s) 130 may receive the information or data associated with the request to modify access to the document. The collaborative server(s) 130 may utilize the information or data to cause the modifications to the document access to be implemented, so that other users of the defined set of users can view the modified document access from their respective electronic devices. At numeral 10, the collaborative server(s) 130 may provide a confirmation to the collaborative application 206. The confirmation may indicate that the modifications to the document access were successfully implemented. The collaborative application 206 may receive the confirmation.

In some variations, the messaging application 208 may receive, in response to the notification and from the user account, a user indication that access to the document should not be modified. For example, the messaging application 208 may receive an indication that the user associated with the electronic device 115 does not want access to the document to be modified (e.g., the user associated with the electronic device 115 selected the option 804b of FIG. 8). If the messaging application 208 receives, in response to the notification and from the user account, a user indication that access to the document should not be modified, the electronic device 115 may determine not to surface the interface (e.g., a user interface) of the collaborative application 206 for display of the document.

While the example of FIG. 7 describes modifying access to a document when access to a message thread associated with the document has been modified, it should be appreciated that in some variations access to a message thread associated with a document may be modified when access to the document is modified. A user that is collaborating on a document via a collaborative application (e.g., collaborative application 206) may want to modify access to the document. The collaborative application 206 may receive, such as from an interface (e.g., a user interface) of the collaborative application 206, a request to modify access to the document. By way of non-limiting example, the request to modify access to the document may be a request to add at least one user account as a collaborator on the document or may be a request to remove at least one user account as a collaborator on the document.

In some variations, collaborative application 206 may send information indicative of the request to modify access to the document the collaborative server(s) 130. The information indicative of the request may include, for example, the user account(s) that is being added as a collaborator or deleted as a collaborator. The collaborative server(s) 130 may receive the information indicative of the request and utilize the information indicative of the request to implement the changes to the document access. For example, the collaborative server(s) 130 may utilize the information indicative of the request to provide and/or revoke access for the proper user account(s). If the collaborative server(s) 130 implements the changes to the document access, such changes may be reflected on all of the devices associated with all user accounts that still have access to the document. The collaborative server(s) 130 may provide confirmation that the request has been fulfilled to the collaborative application 206 at one or more electronic devices, such as at the requesting electronic device.

In one or more implementations, the collaborative application 206 may display a notification, such as in response to receiving the request to modify access to the document. The notification may be displayed on an interface (e.g., a user interface) of the collaborative application 206 at the requesting electronic device. The notification may include a prompt asking whether access to the message thread should be similarly modified.

In some variations, the collaborative application 206 may receive, in response to the notification and from the user account, a user indication that access to the message thread should be modified. In response to receiving the confirmation of the user indication that access to the message thread should be modified, the collaborative application 206 may send an instruction and/or request to the messaging system to modify access to the message thread in accordance with the modification to the document access, such as by referencing the document identifier and/or the obfuscated identifier corresponding to the user being removed. In one or more implementations, the collaborative application 206 may forgo displaying the notification and may automatically instruct and/or request that the messaging system modify access to the message thread in accordance with the modification to the document access.

In one or more implementations, the messaging system may receive the instruction and/or request. In response to receiving the instruction and/or request, the messaging system may surface an interface (e.g., a user interface) of the messaging application 208 for display of the message thread to facilitate modification of access to the message thread. In some variations, the messaging system may forgo surfacing the interface (e.g., a user interface) of the messaging application 208 for display of the message thread and may automatically modify access to the message thread in accordance with the modification to the document access. FIG. 9 illustrates a flow diagram of an example process 900 for sending a message including a document link associated with a collaborative application in accordance with one or more implementations. For explanatory purposes, the process 900 is primarily described herein with reference to the components of FIG. 1 and FIG. 2 (particularly with reference to the messaging system), which may be executed by one or more processors of the electronic device 117 and/or by the messaging server(s) 120. However, the process 900 is not limited to the electronic device 117 and the messaging server(s) 120, and one or more blocks (or operations) of the process 900 may be performed by one or more other components of other suitable devices, such as one or more of the electronic device 110, the electronic device 115, the electronic device 119, the collaborative application 206, and/or one or more servers such as the collaborative server (s) 130. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

In the example process 900, at block 902 a messaging system may receive, via user input, an instruction to create a message thread corresponding to a plurality of user accounts (e.g., user accounts of a messaging system). For example, the instruction may include an instruction to create a message thread including a document link associated with a collaborative application (e.g., collaborative application 206). The collaborative application may be associated with a first entity and the messaging system may be associated with a second, different entity. The collaborative application and the messaging system may communicate via one or more APIs. The messaging system may include an application (e.g., messaging application 208) executing code instantiated on the first participant device and/or a server remote to the first participant device.

In some variations, the collaborative application may be a document collaborative application for collaborating on a text document, a spreadsheet, and/or a slideshow. At least one user associated with the user account may have access to the document in the collaborative application. In some variations, all of multiple participants in the message thread may have access to the document displayed in the collaborative application.

In some variations, before the messaging system receives the instruction to create the message thread with the plurality of user accounts, the device may receive, at the collaborative application, a request to share access to a linked document associated with the document link.

In some variations, before the messaging system receives the instruction to create the message thread with the plurality of user accounts, the messaging system may populate, in response to receiving a request to share access to a document link, an initial message including an object associated with the document link. In one or more implementations, the object includes one or more selectable preferences for the document link. In some variations, a user may be presented with one or more collaboration sharing options that govern information shared between the messaging system and the collaborative application.

At block 904, the messaging system may generate, for each of the user accounts, an obfuscated identifier associated with that user account and a document link. In some variations, the obfuscated identifier associated with each user account and the document link may be based on a Merkle tree associated with at least one device associated with each user account and a document identifier associated with the document link, such as the root of the Merkle tree. In some variations, the at least one device may include multiple devices and generating the obfuscated identifier associated with each user account and the document link may include generating the Merkle tree by combining a respective public key associated with each of the multiple devices (such as public keys derived from and/or specific to the document and/or document identifier) and generating a hash of the Merkle tree. In some variations, the obfuscated identifier for a user account may be a public key of a device associated with the user account. In some variations, the obfuscated identifier for a user account may be a public key that is specific to the device associated with the user account and specific to the document identifier. In some variations, the obfuscated identifier for a user account may be a hash of the public key.

In one or more implementations, each of the plurality of user accounts may be associated with contact information accessible by the messaging system and inaccessible by the collaborative application. The obfuscated identifier may obfuscate the contact information from the collaborative application.

At block 906, the messaging system may provide the obfuscated identifiers to the collaborative application. In some variations, the collaborative application may then provide the obfuscated identifier to a server associated with the collaborative application (e.g., collaborative server(s) 130), such as for storage.

In one or more implementations, an initial message exchanged between the plurality of user accounts with the document link in the message thread may establish, for the collaborative application, the obfuscated identifiers that will be associated with the document link. For example, in one or more implementations, when a request to send the initial message is received by the messaging system, the messaging system may (in response to the request to send the initial message) generate the obfuscated identifiers, provide the obfuscated identifiers to the collaborative application, and receive the document link for inclusion in the initial message that is sent to the plurality of user accounts in the message thread. In this way, the obfuscated identifiers that will be associated with the document link can be established for the collaborative application by the initial message. For example, the collaborative application on a receiving device may verify that a user device accessing the document link corresponds to at least one of the obfuscated identifiers based at least in part on a cryptographic hash associated with one of the obfuscated identifiers generated by the messaging system and included in the initial message.

In some variations, the document link, when selected at a device associated with a particular user account, may be configured to cause the device to perform operations for determining that the particular user account is authorized to access the document link based on the obfuscated identifier and a private key of the device.

FIG. 10 illustrates a flow diagram of an example process 1000 for receiving a message including a document link associated with a collaborative application in accordance with one or more implementations. For explanatory purposes, the process 1000 is primarily described herein with reference to the components of FIG. 1 and FIG. 2 (particularly with reference to the messaging system), which may be executed by one or more processors of the electronic device 119 and/or by the messaging server(s) 120. However, the process 1000 is not limited to the electronic device 119 and the messaging server(s) 120, and one or more blocks (or operations) of the process 1000 may be performed by one or more other components of other suitable devices, such as one or more of the electronic device 110, the electronic device 115, the electronic device 117, the collaborative application 206, and/or one or more servers such as the collaborative server(s) 130. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

In the example process 1000, at block 1002 a messaging system at a device associated with a user account may receive a message including a document link. For example, the document link may be associated with a collaborative application (e.g., collaborative application 206). The collaborative application may be associated with a first entity and the messaging system may be associated with a second, different entity. The collaborative application and the messaging system may communicate via one or more APIs. The messaging system may include an application (e.g., messaging application 208) executing code instantiated on the device and/or a server remote to the first device.

At block 1004, the messaging system may receive a selection of the document link. For example, the messaging system may receive an indication that the user account has clicked on the document link.

At block 1006, the device may obtain an obfuscated identifier of the user account with respect to the document link. The obfuscated identifier may, for example, be included in the message. In some variations, the device may obtain the obfuscated identifier of the user account by obtaining the obfuscated identifier from the message.

In some variations, the obfuscated identifier may be associated with the user account and the document link. The obfuscated identifier may be based on a Merkle tree associated with the device and a document identifier associated with the linked document. The Merkle tree may, for example, be generated based on a combination of a public key associated with the device and multiple respective public keys of multiple additional devices. In one or more implementations, the Merkle tree may include a number of random identifiers (e.g., random public keys) to ensure that the Merkle tree includes a minimum number of public keys.

In one or more implementations, the device may sign the obfuscated identifier of the user account using a private key of the device. The messaging system may send the signed obfuscated identifier of the user account to the collaborative application in response to the selection of the document link.

At block 1008, the device may determine, based on the obfuscated identifier of the user account and a private key of the device, that the user account is authorized to access the document link.

In one or more implementations, the device may determine that the user account is authorized to access the document link by comparing information derived from the signed obfuscated identifier of the user account to a stored obfuscated identifier associated with the user account and the document link to determine that the user account has access to the document link. In one or more implementations, the stored obfuscated identifier is stored in a server associated with the collaborative application. In one or more implementations, the device may determine that the user account is authorized to access the document link by providing cryptographic information (e.g., the obfuscated identifier, the signed obfuscated identifier, information for deriving the obfuscated identifier, a public key, or information derived from the signed obfuscated identifier of the user account) to the server associated with the collaborative application, for comparison, at the server, to a stored obfuscated identifier associated with the user account and the document link to determine that the user account has access to the document link. In these implementations, the device may determine that the user account is authorized by receiving a confirmation from the sever (based on the comparison performed at the server) that the device is authorized. In one or more implementations, the cryptographic information may include a public key of the device (and/or the public key may be derivable from the cryptographic information) and may be signed by the device using the corresponding private key. In this manner, the server can verify the signature using the public key obtained and/or derived from the signed cryptographic information.

At block 1010, the device may surface, in response to the determining that the user account is authorized to access the document link, an interface (e.g., a user interface) of the collaborative application for display of a linked document that is associated with the document link.

In some variations, the collaborative application may provide access to the linked document by the user account.

FIG. 11 illustrates a flow diagram of an example process 1100 for sending a message indicating that a change has been made to a linked document associated with a collaborative application in accordance with one or more implementations. For explanatory purposes, the process 1100 is primarily described herein with reference to the components of FIG. 5 (particularly with reference to the messaging system), which may be executed by one or more processors of the electronic device 117 and/or by the messaging server (s) 120. However, the process 1100 is not limited to the electronic device 117 and the messaging server(s) 120, and one or more blocks (or operations) of the process 1100 may be performed by one or more other components of other suitable devices, such as one or more of the electronic device 110, the electronic device 115, the electronic device 117, the collaborative application 206, and/or one or more servers such as the collaborative server(s) 130. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

In the example process 1100, at block 1102, a messaging system may receive, from a collaborative application (e.g., collaborative application 206), information associated with a change to a linked document that is associated with a document link in a message thread with at least one user account. The collaborative application may be associated with a first entity and the messaging system may be associated with a second, different entity. The collaborative application and the messaging system may communicate via one or more APIs. The messaging system may include an application (e.g., messaging application 208) executing code instantiated on a participant device and/or a server remote to the participant device.

In some variations, the collaborative application may be a document collaborative application for collaborating on a text document, a spreadsheet, and/or a slideshow.

In one or more implementations, a plurality of users associated with the at least one user account and that are participants in the message thread may have access to the linked document in the collaborative application.

In some variations receiving the information associated with the change to the linked document includes receiving an indication that a user associated with the at least one user accounts has made a modification to the linked document. In other variations, receiving the information associated with the change to the linked document includes receiving an indication that a user that is not associated with the at least one user account has made a modification to the linked document.

In some variations, the information associated with the change to the linked document includes an indication that at least one of text, an image, a video, audio, a chart, a table, a comment, or a reaction has been added to or deleted from the linked document. In some variations, the information associated with the change to the linked document includes an indication that one or more users associated with the at least one user account has been tagged or mentioned in the document.

In some variations, the at least one user account may include a plurality of user accounts. Each of the plurality of user accounts may have an obfuscated identifier generated by the messaging system for use by the collaborative application.

In one or more implementations, receiving the information associated with the change may include receiving the information associated with the change after providing, from the messaging system to the collaborative application, an obfuscated identifier generated by the messaging system and associated with the at least one user account and the document link. In some variations, an initial message exchanged between the plurality of user accounts with the document link in the message thread establishes, for the collaborative application, the obfuscated identifiers that will be associated with the document link. In some variations, the collaborative application may verify that a device accessing the document link corresponds to at least one of the obfuscated identifiers based on a cryptographic hash associated with the obfuscated identifier that was generated by the messaging system.

At block 1104, the messaging system may provide, in response to receiving the information associated with the change to the linked document, an update to the message thread with the at least one user account. For example, the messaging system may send a message, in the message thread, indicating the change to the linked document.

In some variations, providing the updated to the message thread with the at least one user account may include distributing the update to the message thread to a first user device and a second user device that are both associated with a single user account of the at least one user account. The updated to the message thread may be displayed at an earliest one of the first user device and the other second user device to display the message thread after receiving the update to the message thread. Display of the update to the message thread may be foregone at a subsequent one of the first user device and the second user device to display message thread after receiving the update to the message thread.

If receiving the information associated with the change to the linked document includes receiving an indication that a user associated with the at least one user accounts has made a modification to the linked document, providing the update to the message thread with the at least one user account may include displaying information indicative of the user with the update. If receiving the information associated with the change to the linked document includes receiving an indication that a user that is not associated with the at least one user account has made a modification to the linked document, providing the update to the message thread with the at least one user account may include displaying the update without displaying information indicative of the user.

In some variations, a selection of the update to the message thread may be configured to surface an interface (e.g., a user interface) of the collaborative application for display of the linked document.

FIG. 12 illustrates a flow diagram of an example process 1200 for facilitating modification of access to a document when access to a message thread has been modified in accordance with one or more implementations. For explanatory purposes, the process 1200 is primarily described herein with reference to the components of FIG. 7 (particularly with reference to the messaging system), which may be executed by one or more processors of the electronic device 115 and/or by the messaging server(s) 120. However, the process 1200 is not limited to the electronic device 115 and the messaging server(s) 120, and one or more blocks (or operations) of the process 1200 may be performed by one or more other components of other suitable devices, such as one or more of the electronic device 110, the electronic device 115, the electronic device 117, the collaborative application 206, and/or one or more servers such as the collaborative server(s) 130. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

In the example process 1200, at block 1202, a messaging system at a device may receive, from a user account, a first request to modify access to a messaging thread being conducted via the messaging system. The message thread may be associated with a document. The document may be associated with a collaborative application. The collaborative application may be associated with a first entity and the messaging system may be associated with a second, different entity. The collaborative application and the messaging system may communicate via one or more APIs. The messaging system may include an application (e.g., messaging application 208) executing code instantiated on a participant device and/or a server remote to the participant device.

In some variations, the collaborative application may be a document collaborative application for collaborating on a text document, a spreadsheet, and/or a slideshow. At least one user associated with the user account may have access to the document in the collaborative application.

In some variations, the request to modify access to the message thread may include a request to add at least one participant to the message thread. In some variations, the request to modify access to the message thread may include a request to remove at least one participant from the message thread.

At block 1204, the messaging system may cause, in response to receiving the first request, display of a first notification. The first notification may include a prompt to indicate whether access to the document should be modified (e.g., as described herein in connection with FIG. 8).

If the request to modify access to the message thread included a request to add at least one participant to the message thread, the first notification may ask whether the at least one participant should be given access to the document. If the request to modify access to the message thread includes a request to remove at least one participant from the message thread, the first notification may ask whether access to the document should be revoked for the at least one participant.

At block 1206, the messaging system may receive, in response to the first notification and from the user account, a user indication that access to the document should be modified. For example, the user indication may be a user selection of a "yes" button in the prompt.

At block 1208, the device may surface, in response to receiving the user indication, an interface (e.g., a user interface) of the collaborative application for display of the document.

In some variations, the collaborative application may receive an instruction to modify access to the document. For example, the collaborative application may receive, via the interface (e.g., the user interface) of the collaborative application, an instruction to modify access to the document. The collaborative application may cause access to the document to be modified.

In one or more implementations, the messaging system may receive, from the user account, a second request to modify access to the message thread. In response to receiving the second request, the messaging system may cause display of a second notification. The second notification may include a prompt to indicate whether access to the document should be modified. In response to the second notification, the messaging system may receive, from the user account, an indication that access to the document should not be modified. The device may determine, in response to receiving the indication that access to the document should not be modified, not to surface the interface (e.g., the user interface) of the collaborative application for display of the document.

FIG. 13 illustrates a flow diagram of an example process 1300 for accessing a message thread about a document from within the document in accordance with one or more implementations. For explanatory purposes, the process 1300 is primarily described herein with reference to the components of FIG. 1 and FIG. 2 (particularly with reference to the messaging system), which may be executed by one or more processors of the electronic device 117 and/or by the messaging server(s) 120. However, the process 1300 is not limited to the electronic device 119 and the messaging server(s) 120, and one or more blocks (or operations) of the process 1300 may be performed by one or more other components of other suitable devices, such as one or more of the electronic device 110, the electronic device 115, the electronic device 117, the collaborative application 206, and/or one or more servers such as the collaborative server(s) 130. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

In the example process 1300, at block 1302, a messaging system at a device may receive, from a collaborative application, a request to display a message thread within an interface (e.g., a user interface) of the collaborative application. The collaborative application may be associated with a first entity and the messaging system may be associated with a second, different entity. The collaborative application and the messaging system may communicate via one or more APIs. The messaging system may include an application (e.g., messaging application 208) executing code instantiated on a participant device and/or a server remote to the participant device.

In some variations, the collaborative application may be a document collaborative application for collaborating on a text document, a spreadsheet, and/or a slideshow. At least one user associated with the user account may have access to the document in the collaborative application. In some variations, all of multiple participants in the message thread may have access to a document displayed in the collaborative application.

In some variations, receiving the request to display the message thread within the interface (e.g., user interface) of the collaborative application may include receiving an indication that a user associated with the collaborative application instructed the collaborative application to display the message thread within the interface (e.g., user interface) of the collaborative application.

In one or more implementations, the messaging system may determine that the user associated with the collaborative application is a participant in the message thread.

At 1304, display of the message thread may be caused within the interface (e.g., user interface) of the collaborative application by providing the message thread for display within a predefined region of the user interface of the collaborative application without providing the message thread to the collaborative application. For example, the collaborative application may provide a user interface (e.g., a user interface) that includes a placeholder region that can be populated, with the message thread, by the messaging system and without providing the collaborative application access to the contents of the message thread.

In some variations, display of the message thread within the interface (e.g., the user interface) may be caused by displaying the message thread within a first portion of the interface and displaying a document within a second portion of the interface. The second portion may be different from the first portion. The first portion and the second portion may not overlap.

In some variations, after display of the message thread and the document is caused, the messaging system may receive an additional message in the message thread. Display of the message thread including the additional message may be caused, by the messaging system and without exposing the additional message to the collaborative application, within the interface of the collaborative application.

In one or more implementations, after display of the message thread is caused within the interface (e.g., the user interface) of the collaborative application, the device may receive, via the message thread displayed within the interface of the collaborative application, a user request to send a message in the message thread. The message may be sent via the messaging system without providing the user request or the message to the collaborative application.

As described herein, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, email addresses, voice data, audio data, video data, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing integration between messaging systems and collaborative applications. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing integration between messaging systems and collaborative applications, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

FIG. 14 illustrates an electronic system 1400 with which one or more implementations of the subject technology may be implemented. The electronic system 1400 can be, and/or can be a part of, the electronic device 114, the electronic device 115, the electronic device 117, the electronic device 119, and/or the server 120 and/or the collaborative server 130 shown in FIG. 1. The electronic system 1400 may include various types of computer readable media and interfaces for various other types of computer readable media. The electronic system 1400 includes a bus 1408, one or more processing unit(s) 1412, a system memory 1404 (and/or buffer), a ROM 1410, a permanent storage device 1402, an input device interface 1414, an output device interface 1406, and one or more network interfaces 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multi-core processor in different implementations.

The ROM 1410 stores static data and instructions that are needed by the one or more processing unit(s) 1412 and other modules of the electronic system 1400. The permanent storage device 1402, on the other hand, may be a read-and-write memory device. The permanent storage device 1402 may be a non-volatile memory unit that stores instructions and data even when the electronic system 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1412 may need at runtime. In one or more implementations, the processes of the subject disclosure are stored in the system memory 1404, the permanent storage device 1402, and/or the ROM 1410. From these various memory units, the one or more processing unit(s) 1412 retrieves instructions to execute and data to process in order to execute the processes of one or more implementations.

The bus 1408 also connects to the input and output device interfaces 1414 and 1406. The input device interface 1414 enables a user to communicate information and select commands to the electronic system 1400. Input devices that may be used with the input device interface 1414 may include, for example, alphanumeric keyboards and pointing devices (also called "cursor control devices"). The output device interface 1406 may enable, for example, the display of images generated by electronic system 1400. Output devices that may be used with the output device interface 1406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks and/or to one or more network nodes, such as the electronic device 145 shown in FIG. 1, through the one or more network interface(s) 1416. In this manner, the electronic system 1400 can be a part of a network of computers (such as a LAN, a wide area network ("WAN"), or an Intranet, or a network of networks, such as the Internet. Any or all components of the electronic system 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, via a user input to a messaging system, a plurality of identifiers, respectively, for a plurality of user accounts with the messaging system along with an instruction to create a message thread with the plurality of user accounts, the message thread including a document identifier associated with a document that is viewable using a collaborative application separate from the messaging system;

generating, for each of the plurality of user accounts, an obfuscated identifier that is based on a corresponding one of the plurality of identifiers for that user account and the document identifier; and wherein an instruction, received by the messaging system, to transmit an initial message via the messaging system between the plurality of user accounts with a document link for the document in the message thread results in:
   transmitting the initial message via the messaging system between the plurality of user accounts, and
   sending, by the messaging system to the collaborative application, the obfuscated identifiers that will be associated with the document link for the document.

2. The method of claim 1, wherein the messaging system is configured to communicate with the collaborative application via one or more APIs (Application Program Interfaces).

3. The method of claim 1, wherein the messaging system includes at least one of an application executing code instantiated on a user device and/or a server remote to the user device.

4. The method of claim 1, wherein the collaborative application is associated with a first entity and the messaging system is associated with a second entity.

5. The method of claim 1, wherein, responsive to the instruction to create the message thread, a user corresponding to one of the plurality of user accounts is presented with one or more collaboration sharing options that govern information shared between the messaging system and the collaborative application.

6. The method of claim 1, further comprising, before receiving the instruction to create the message thread with the plurality of user accounts:
   sending, by the messaging system to the collaborative application, a request to share access to the document.

7. The method of claim 1, further comprising, before receiving the instruction to create the message thread with the plurality of user accounts:
   populating, in response to receiving a request to share access to the document and by the messaging system, the initial message including an object associated with the document link.

8. The method of claim 7, wherein the object comprises one or more selectable preferences for the document link.

9. The method of claim 1, wherein, for each of the plurality of user accounts, the obfuscated identifier that is based on the corresponding one of the plurality of identifiers and the document link is based on a Merkle tree associated with at least one device associated with that user account and the document identifier.

10. The method of claim 9, wherein the at least one device comprises multiple devices and wherein generating the obfuscated identifier that is based on the corresponding one of the plurality of identifiers for each user account and the document link comprises:
   generating the Merkle tree by combining a respective public key associated with each of the multiple devices; and
   generating a hash of the Merkle tree.

11. The method of claim 1, wherein the plurality of identifiers for the plurality of user accounts with the messaging system each comprise contact information that is accessible by the messaging system and inaccessible by the collaborative application, and wherein the obfuscated identifiers obfuscate the contact information from the collaborative application.

12. The method of claim 1, further comprising providing, by the collaborative application, the obfuscated identifier for each of the plurality of user accounts to a server associated with the collaborative application.

13. The method of claim 1, wherein the document link, when selected at a device associated with a particular user account of the plurality of user accounts, is configured to cause the device to determine that the particular user account is authorized to access the document link based on the obfuscated identifier for the particular user account and a private key of the device.

14. A messaging system configured to:

receive, via a user input to the messaging system, a plurality of identifiers, respectively, for a plurality of user accounts with the messaging system along with an instruction to create a message thread with the plurality of user accounts, the message thread including a document identifier associated with a document that is viewable using a collaborative application separate from the messaging system;

generate, for each of the plurality of user accounts, an obfuscated identifier that is based on a corresponding one of the plurality of identifiers for that user account and the document identifier; and wherein an instruction, received by the messaging system, to transmit an initial message via the messaging system between the plurality of user accounts with a document link for the document in the message thread results in:

transmitting the initial message via the messaging system between the plurality of user accounts, and sending, by the messaging system to the collaborative application, the obfuscated identifiers that will be associated with the document link for the document.

15. The messaging system of claim 14, wherein the messaging system is further configured to communicate with the collaborative application via one or more APIs (Application Program Interfaces).

16. The messaging system of claim 14, wherein the messaging system includes at least one of an application executing code instantiated on a user device and/or a server remote to the user device.

17. The messaging system of claim 14, wherein the collaborative application is associated with a first entity and the messaging system is associated with a second entity.

18. The messaging system of claim 14, wherein, responsive to the instruction to create the message thread, a user corresponding to one of the plurality of user accounts is presented with one or more collaboration sharing options that govern information shared between the messaging system and the collaborative application.

19. The messaging system of claim 14, wherein the messaging system is further configured to, before receiving the instruction to create the message thread with the plurality of user accounts:

send, by the messaging system to the collaborative application, a request to share access to the document.

20. The messaging system of claim 14, wherein the messaging system is further configured to, before receiving the instruction to create the message thread with the plurality of user accounts:

populate, in response to receiving a request to share access to the document and by the messaging system, the initial message including an object associated with the document link.

21. The messaging system of claim 20, wherein the object comprises one or more selectable preferences for the document link.

22. The messaging system of claim 14, wherein the obfuscated identifier that is based on the corresponding one of the plurality of identifiers for each user account and the document link is based on a Merkle tree associated with at least one device associated with that user account and the document identifier.

23. The messaging system of claim 22, wherein the at least one device comprises multiple devices and wherein generating the obfuscated identifier that is based on the corresponding one of the plurality of identifiers for each user account and the document link comprises:

generating the Merkle tree by combining a respective public key associated with each of the multiple devices; and generating a hash of the Merkle tree.

24. The messaging system of claim 14, wherein the plurality of identifiers for the plurality of user accounts with the messaging system each comprise contact information accessible by the messaging system and inaccessible by the collaborative application, and wherein the obfuscated identifiers obfuscate the contact information from the collaborative application.

25. The messaging system of claim 14, wherein the document link, when selected at a device associated with a particular user account of the plurality of user accounts, is configured to cause the device to determine that the particular user account is authorized to access the document link based on the obfuscated identifier for the particular user account and a private key of the device.

26. A non-transitory computer-readable medium storing instructions which, when executed by one or more processors, cause the one or more processors to perform operations comprising:

receiving, via a user input to a messaging system, a plurality of identifiers, respectively, for a plurality of user accounts with the messaging system along with an instruction to create a message thread with the plurality of user accounts, the message thread including a document identifier associated with a document that is viewable using a collaborative application separate from the messaging system;

generating, for each of the plurality of user accounts, an obfuscated identifier that is based on a corresponding one of the plurality of identifiers for that user account and the document identifier; and wherein an instruction, received by the messaging system, to transmit an initial message via the messaging system between the plurality of user accounts with a document link for the document in the message thread results in:

transmitting the initial message via the messaging system between the plurality of user accounts, and sending, by the messaging system to the collaborative application, the obfuscated identifiers that will be associated with the document link for the document.

27. The non-transitory computer-readable medium of claim 26, wherein the messaging system is configured to communicate with the collaborative application via one or more APIs (Application Program Interfaces).

28. The non-transitory computer-readable medium of claim 26, wherein the messaging system includes at least one of an application executing code instantiated on a user device and/or a server remote to the user device.

29. The non-transitory computer-readable medium of claim 26, wherein the collaborative application is associated with a first entity and the messaging system is associated with a second entity.

30. The non-transitory computer-readable medium of claim 26, wherein, responsive to the instruction to create the message thread, a user corresponding to one of the plurality of user accounts is presented with one or more collaboration sharing options that govern information shared between the messaging system and the collaborative application.

31. The non-transitory computer-readable medium of claim 26, the operations further comprising, before receiving the instruction to create the message thread with the plurality of user accounts:

sending, by the messaging system to the collaborative application, a request to share access to the document.

32. The non-transitory computer-readable medium of claim 26, the operations further comprising, before receiving the instruction to create the message thread with the plurality of user accounts:

populating, in response to receiving a request to share access to the document and by the messaging system, the initial message including an object associated with the document link.

33. The non-transitory computer-readable medium of claim 32, wherein the object comprises one or more selectable preferences for the document link.

34. The non-transitory computer-readable medium of claim 26, wherein the obfuscated identifier that is based on the corresponding one of the plurality of identifiers for each user account and the document link is based on a Merkle tree associated with at least one device associated with that user account and a document identifier.

35. The non-transitory computer-readable medium of claim 34, wherein the at least one device comprises multiple devices and wherein generating the obfuscated identifier that is based on the corresponding one of the plurality of identifiers for each user account and the document link comprises:

generating the Merkle tree by combining a respective public key associated with each of the multiple devices; and generating a hash of the Merkle tree.

36. The non-transitory computer-readable medium of claim 26, wherein the plurality of identifiers for the plurality of user accounts with the messaging system each comprise contact information that is accessible by the messaging system and inaccessible by the collaborative application, and wherein the obfuscated identifiers obfuscate the contact information from the collaborative application.

37. The non-transitory computer-readable medium of claim 26, wherein the document link, when selected at a device associated with a particular user account of the plurality of user accounts, is configured to cause the device to determine that the particular user account is authorized to access the document link based on the obfuscated identifier for the particular user account and a private key of the device.

\*  \*  \*  \*  \*